(12) United States Patent
Kirkeby et al.

(10) Patent No.: US 11,977,621 B2
(45) Date of Patent: May 7, 2024

(54) SYSTEM AND METHODS FOR AUTHENTICATING TANGIBLE PRODUCTS

(71) Applicants: Cynthia Fascenelli Kirkeby, Orange, CA (US); Anthony Suk Ko, Yorba Linda, CA (US)

(72) Inventors: Cynthia Fascenelli Kirkeby, Orange, CA (US); Anthony Suk Ko, Yorba Linda, CA (US)

( * ) Notice: Subject to any disclaimer, the term of this patent is extended or adjusted under 35 U.S.C. 154(b) by 0 days.

(21) Appl. No.: 18/133,892

(22) Filed: Apr. 12, 2023

(65) Prior Publication Data

US 2023/0252125 A1 Aug. 10, 2023

Related U.S. Application Data

(63) Continuation-in-part of application No. 17/844,218, filed on Jun. 20, 2022, which is a continuation-in-part of application No. 17/283,156, filed as application No. PCT/US2019/055425 on Oct. 9, 2019, now Pat. No. 11,397,804.

(60) Provisional application No. 62/744,644, filed on Oct. 12, 2018.

(51) Int. Cl.
*G06F 21/44* (2013.01)

(52) U.S. Cl.
CPC .................... *G06F 21/44* (2013.01)

(58) Field of Classification Search
CPC .............................. G06F 21/44; H04L 9/3247
See application file for complete search history.

(56) References Cited

U.S. PATENT DOCUMENTS

| 7,532,122 | B2 | 5/2009 | Aull et al. |
| 7,602,291 | B2 | 10/2009 | Tseng et al. |
| 7,750,793 | B2 | 7/2010 | Juels |
| 7,941,832 | B2 | 5/2011 | Tsutsui et al. |
| 8,078,875 | B2 | 12/2011 | Cowburn et al. |
| 8,154,405 | B2 | 4/2012 | Gravelle et al. |
| 8,212,651 | B2 | 7/2012 | Bauchot et al. |
| 8,458,474 | B2 | 6/2013 | Robshaw et al. |

(Continued)

OTHER PUBLICATIONS

International Search Report and Written Opinion, PCT/US2019/055425, dated Jan. 9, 2020.

*Primary Examiner* — Jeffrey D. Popham
(74) *Attorney, Agent, or Firm* — Master Key IP, LLP; Justin G. Sanders

(57) ABSTRACT

A system and associated methods for authenticating physical or digital objects are disclosed. In at least one embodiment, a plurality of authentication devices is initiated, with each of the authentication devices associated with a one of the objects and containing a unique authentication sequence algorithm used to generate a sequence of device sequence values stored on each said authentication device. Upon a user desiring to authenticate a given object via a user application on a user device, the authentication device provides a data set to an authentication server. If the authentication server locates the authentication device in an authentication table, and subsequently processes the data set successfully, the authentication server obtains from the authentication table a server sequence value associated with the authentication device. If the device sequence value is later in the sequence than the server sequence value, the authentication server transmits a success message to the user application.

20 Claims, 6 Drawing Sheets

(56) References Cited

U.S. PATENT DOCUMENTS

| | | |
|---|---|---|
| 8,683,210 B2 | 3/2014 | Devadas |
| 8,896,420 B2 | 11/2014 | Chang et al. |
| 8,917,165 B2 | 12/2014 | Marques et al. |
| 8,938,615 B2 | 1/2015 | Neill et al. |
| 9,213,871 B1 | 12/2015 | Diorio et al. |
| 9,231,947 B2 | 1/2016 | Fairbanks et al. |
| 9,489,785 B2 | 11/2016 | Klammer et al. |
| 9,501,675 B1 | 11/2016 | Diorio et al. |
| 9,946,903 B2 | 4/2018 | Kozlov |
| 2002/0005774 A1 | 1/2002 | Rudolph et al. |
| 2006/0294583 A1 | 12/2006 | Cowburn et al. |
| 2007/0194879 A1 | 8/2007 | Backes et al. |
| 2008/0040276 A1 | 2/2008 | Hammad et al. |
| 2008/0098469 A1 | 4/2008 | Morijiri et al. |
| 2008/0120236 A1* | 5/2008 | Faith ............... G06Q 20/40 235/492 |
| 2009/0096574 A1 | 4/2009 | Oberle |
| 2010/0001840 A1 | 1/2010 | Kang et al. |
| 2010/0079243 A1 | 4/2010 | Hamada |
| 2010/0150348 A1 | 6/2010 | Fairbanks et al. |
| 2011/0086632 A1* | 4/2011 | Tumey ............ H04M 1/72412 455/421 |
| 2011/0153512 A1 | 6/2011 | Peckover |
| 2011/0291803 A1 | 12/2011 | Bajic et al. |
| 2013/0124854 A1 | 5/2013 | Kato et al. |
| 2014/0008429 A1 | 1/2014 | Wang et al. |
| 2014/0359746 A1 | 12/2014 | Tezuka et al. |
| 2015/0002260 A1 | 1/2015 | Brown |
| 2016/0110571 A1 | 4/2016 | Jung et al. |
| 2016/0358186 A1* | 12/2016 | Radocchia ............ H04W 12/02 |
| 2017/0032285 A1 | 2/2017 | Sharma et al. |
| 2018/0343123 A1* | 11/2018 | Liu ..................... H04L 9/3247 |
| 2019/0026456 A1 | 1/2019 | Hon et al. |

\* cited by examiner

SYSTEM AND METHODS FOR AUTHENTICATING TANGIBLE PRODUCTS

RELATED APPLICATIONS

This is a continuation-in-part application and so claims the benefit pursuant to 35 U.S.C. § 120 of a prior filed and U.S. non-provisional patent application Ser. No. 17/844,218, filed on Jun. 20, 2022, which itself is a continuation-in-part application of U.S. non-provisional patent application Ser. No. 17/283,156, filed on Apr. 6, 2021 (now U.S. Pat. No. 11,397,804, issued on Jul. 26, 2022), which is a 35 U.S.C. § 371 US national stage entry of international application number PCT/US2019/055425, filed on Oct. 9, 2019, which claims priority to U.S. provisional application Ser. No. 62/744,644, filed on Oct. 12, 2018. The contents of the aforementioned applications are incorporated herein by reference.

BACKGROUND

The subject of this patent application relates generally to authentication systems, and more particularly to a system and associated methods for authenticating physical and digital objects.

Applicant(s) hereby incorporate herein by reference any and all patents and published patent applications cited or referred to in this application.

By way of background, the creation of counterfeit products, both physical and digital, from technology to consumer goods, is a massive problem that injures our economy, causes the loss of jobs, damages company reputations, and in some cases may even cause injury or death to the public. According to the U.S. Department of Homeland Security, in 2017 the intellectual property rights ("IPR") seizures of confiscated counterfeit goods in the U.S. added up to a total estimated manufacturer's suggested retail price ("MSRP") of approximately $1.2 trillion. As such, a device and system to authenticate and verify the brand origin of tangible products is critically needed to protect company assets and reputations, as well as consumer finances and health.

Counterfeit tangible products are often the cause of product failure in many industries, especially those with technology or engineered components, such as the automotive industry. As already noted, these inferior counterfeit products may expose a manufacturer to liability for damage or injuries to the public due to unauthorized component integration by third parties with mistaken attribution to the original manufacturer.

Current methods of counterfeit prevention for tangible products include: holograms, stickers, watermarks, adhesive seals, and other special identifying markers that are, unfortunately, easily bypassed by counterfeiters. Other authentication methods such as one-time passwords, and challenge-response protocols are commonly used for online user authentication. The ability to duplicate an identifying marker, barcode or other authentication code when a system is cracked or compromised allows counterfeiters to duplicate hundreds or thousands of instances of a specific brand model, severely impacting the legitimate brand entity's ability to profit from its intellectual property.

The general public also typically lacks the expertise to separate fake identifying markers from genuine ones, even if the fake markers are poorly made. This has spawned the creation of product authentication experts and platforms which attempt to identify and certify products by detailed examination of the goods. Well counterfeited goods, however, can defeat these attempts. A robust solution for the problem of mass counterfeiting is desperately needed. Static countermeasures, like holograms and stickers, and existing electronic systems and human identification experts, are not sufficient protection against sophisticated counterfeiters.

Near-field communication ("NFC") devices that generate unique one-time codes for authentication currently exist; however they are primarily used in business-to-business ("B2B") applications. These NFC tags can also be activated and read by any nearby enabled NFC reader, leading to potential privacy issues.

Thus, a new system and associated methods for authenticating physical and digital objects, where the identity of the item's brand entity and ancillary information is authenticated through a device integrated with, attached to, or otherwise associated with the object, is desired.

Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing an object authentication system and associated methods of use. In at least one embodiment, upon a user desiring to authenticate a given physical or digital object via a user application on a user device in the user's possession or control, an authentication request is initiated with an authentication device attached to the object. A device sequence value on the authentication device is advanced based on an authentication sequence algorithm that is unique to at least one of the authentication device, a select group of authentication devices, the corresponding object with which the authentication device is associated, or a select group of objects, as compared to other ones of the authentication devices or objects with which other ones of the authentication devices are associated, and the authentication device generates a data set containing at least one of a unique device identifier, a unique device key, a device count, and the device sequence value. The authentication device provides the data set and the device identifier to the user application. The user application transmits the data set and the device identifier to an authentication server, which maintains an at least one authentication table containing select data associated with the at least one object and associated authentication device. If the authentication server determines that the transmitted device identifier does not match any of the at least one device identifier stored in the at least one authentication table, the authentication server transmits an error message to the user application. Otherwise, if the authentication server locates the transmitted device identifier in the at least one authentication table, the authentication server obtains from the authentication table a server sequence value associated with the transmitted device identifier, and compares the server sequence value with the device sequence value. If the device sequence value is earlier in the sequence than the server sequence value, or in the same position in the sequence as the server sequence value, the authentication server transmits an error message to the user application. Otherwise, the authentication server transmits a success message to the user application, indicating that the authentication of said object has succeeded. The authentication server also sets the server sequence value to be equal to the device sequence value.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
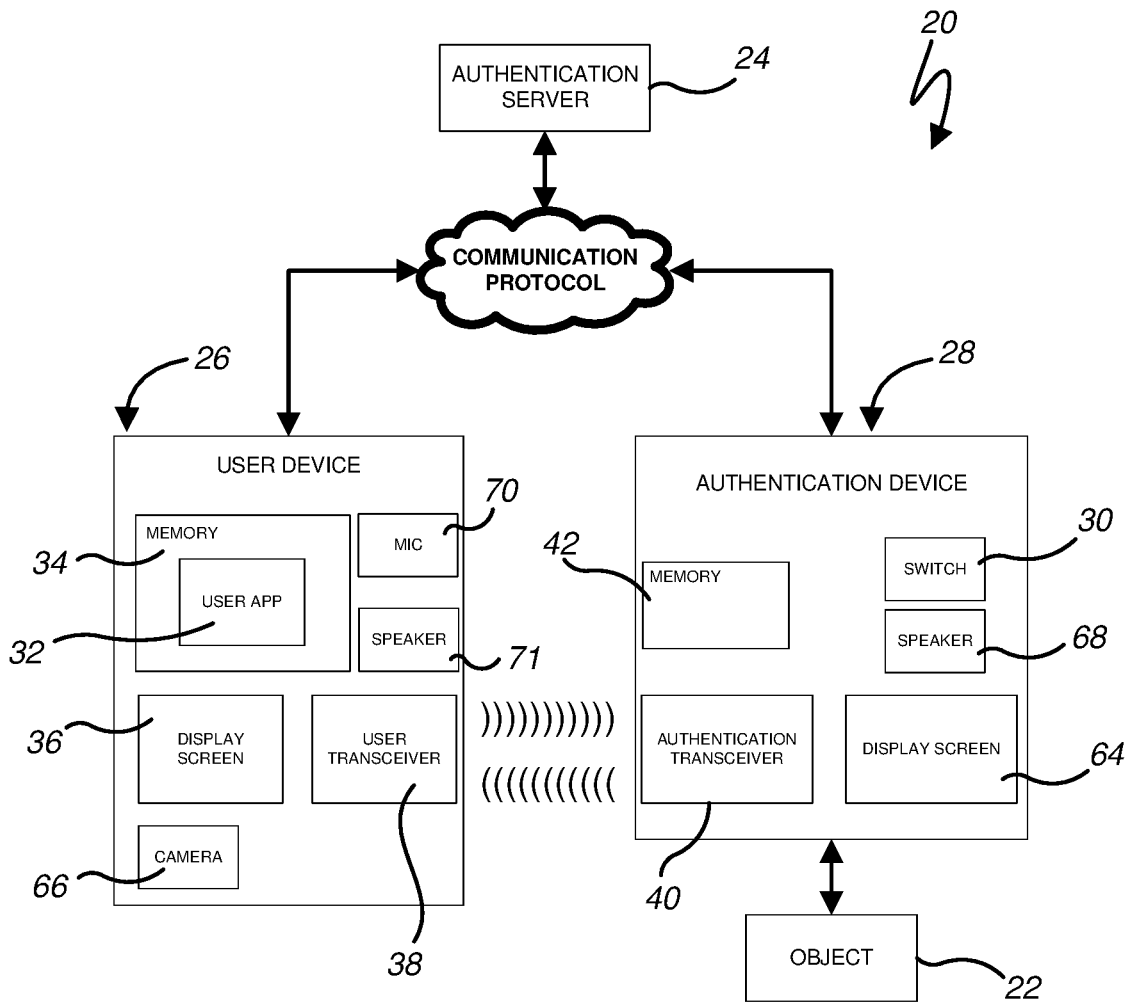
FIG. 1 is a simplified schematic view of an exemplary object authentication system, in accordance with at least one embodiment.

Turning now to FIG. 1, there is shown a simplified schematic view of an exemplary object authentication system 20 for authenticating an at least one physical or digital object 22. In at least one embodiment, the system 20 provides a central authentication server 24, an at least one user device 26 associated with an at least one user, and an at least one authentication device 28 associated with the at least one object 22. As discussed further below, in at least one embodiment, the authentication server 24 is in selective communication with the at least one user device 26, with the authentication server 24 being configured for receiving and processing data related to the at least one object 22. In at least one alternate embodiment, the authentication server 24 is omitted, such that the system 20 and associated methods described herein are implemented solely through the at least one user device 26 and the at least one authentication device 28—thus, any methods or functionality described herein as being carried out by the authentication server 24 may, in at least one embodiment, also be carried out by the at least one user device 26 and/or the at least one authentication device 28, regardless of whether such embodiments nevertheless incorporate the authentication server 24.

At the outset, it should be noted that communication between each of the authentication server 24, at least one user device 26, and at least one authentication device 28 may be achieved using any wired- or wireless-based communication protocol (or combination of protocols) now known or later developed. As such, the present invention should not be read as being limited to any one particular type of communication protocol, even though certain exemplary protocols may be mentioned herein for illustrative purposes, such as the Internet or a local area network for example. Similarly, in at least one embodiment, communications between each of the authentication server 24, at least one user device 26, and at least one authentication device 28 may be encrypted using any encryption method (or combination of methods) now known or later developed. It should also be noted that the term "user device" is intended to include any type of computing or electronic device now known or later developed—such as desktop computers, mobile phones, smartphones, laptop computers, tablet computers, personal data assistants, gaming devices, wearable devices, etc.—capable of substantially carrying out the functionality described herein. As such, the present invention should not be read as being limited to use with any one particular type of computing or electronic device, even though certain exemplary devices may be mentioned or shown herein for illustrative purposes. It should also be noted that, in at least one embodiment, the term "object" is intended to generally include any type of physical or digital object, now known or later developed, that might be purchased or otherwise acquired by the at least one user, or for which the authenticity of said physical or digital object is being sought by the at least one user. In at least one embodiment, authenticity is intended to include not just the genuine nature of the object 22, but also the current ownership of the object 22 as well, as discussed further below. In at least one further embodiment, the term "object" is intended to also generally include an individual or entity, including but not limited to the at least one user themselves.

With continued reference to FIG. 1, in the exemplary embodiment, each of the authentication server 24, at least one user device 26, and at least one authentication device 28 contains the hardware and software necessary to carry out the exemplary methods for authenticating the at least one object 22, as described herein. Furthermore, in at least one embodiment, the authentication server 24 comprises a plurality of computing devices selectively working in concert with one another to carry out the exemplary methods for authenticating the at least one object 22, as described herein. In at least one embodiment, the at least one user device 26 provides a user application 32, system software or some other software residing on the user device 26 (hereinafter generally referred to as "user application" for simplicity purposes) residing locally in memory 34 on the user device 26, the user application 32 being configured for selectively communicating with at least one of the authentication server 24 and the at least one authentication device 28, as discussed further below. Accordingly, then, in at least one embodiment, the at least one user device 26 is in the possession or control of a user who is desirous of verifying the authenticity of the at least one object 22—i.e., confirming that the object 22 is genuine and, in the case of the object 22 being a product, originated from the true manufacturer of origin.

In at least one embodiment, the at least one authentication device 28 is attached to or otherwise associated with one of the at least one object 22 (for simplicity purposes, the term "attached" is used herein to generally refer to the association between each authentication device 28 and the corresponding object 22, with said attachment being physical and/or digital). In other words, in at least one embodiment, the system 20 utilizes a one-to-one relationship between authentication devices 28 and objects 22 (i.e., a separate authentication device 28 for each individual object 22). Thus, in at least one embodiment, the at least one authentication device 28 is physically attached or otherwise affixed to the corresponding object 22 in any form or method now known or later developed. For example, where a given object 22 is a retail item, such as a handbag, the corresponding authentication device 28 may be physically embedded within, or otherwise integrated with, the corresponding object 22. In at least one further example, the authentication device 28 may be incorporated into a hang tag or packaging. Typically, in the case of the object 22 being a product, a given authentication device 28 is attached to the corresponding object 22 by the manufacturer of said object 22; however, in some cases, other individuals or entities—such as vendors, distributors, sales personnel, retail management, wholesale management or even consumers—may attach the authentication device 28 (especially since any or all of these individuals or entities can benefit from using the system 20).

In at least one embodiment, the various components of the at least one user device 26 may reside on a single computing and/or electronic device, or may separately reside on two or more computing and/or electronic devices in communication with one another. In at least one embodiment, the functionality provided by the user application 32 resides remotely in memory on the authentication server 24, with each user device 26 capable of accessing said functionality via an online portal hosted by the authentication server 24, either in addition to or in lieu of the user application 32 residing locally in memory 34 on the at least one user device 26. It should be noted that, for simplicity purposes, the functionality provided by the user application 32 will be described herein as such—even though certain embodiments may provide said functionality through an online portal, or through other means on the user device 26. Accordingly, it should also be noted that, for simplicity purposes, when discussing functionality and the various methods that may be carried out by the system 20 herein, the terms "user device" and "user application" are intended to be interchangeable, given that the various methods may be carried out by the user application 32 in at least one embodiment, and by the user device 26 via means other than the user application 32 in at least one alternate embodiment. It should also be noted that the term "memory," as it relates to each of the at least one user device 26 and authentication device 28, is intended to include any type of electronic storage medium (or combination of storage mediums) now known or later developed, such as local hard drives, RAM, flash memory, secure digital ("SD") cards, external storage devices, network or cloud storage devices, integrated circuits, etc.

With continued reference to FIG. 1, in at least one embodiment, the at least one user device 26 provides an at least one display screen 36 for providing an at least one graphical user interface to assist the associated user in possession of said user device 26 to utilize the various functions provided by the system 20. In at least one alternate embodiment, the at least one user device 26 provides at least one of a speaker, a braille reader, or another type of output device—either in addition to or in lieu of a display screen 36—along with at least one input device—such as a microphone 70, a keypad, a keyboard, a mouse, or another type of input device—so as to assist the associated user in possession of said user device 26 to utilize the various functions provided by the system 20. Additionally, in at least one embodiment, the at least one user device 26 provides an at least one user transceiver 38 configured for selectively communicating with a corresponding authentication transceiver 40 of the at least one authentication device 28, as discussed further below. In at least one such embodiment, the user and authentication transceivers 38 and 40 may utilize near-field communication ("NFC"), or alternatively may utilize radio frequency identification ("RFID") or another radio frequency transmission. In still further embodiments, the user and authentication transceivers 38 and 40 may utilize any other wireless communication protocol, now known or later developed, such as Bluetooth, cellular, Wi-Fi or acoustic signals for example. As such, the present invention should not be read as being limited to use with any one particular type of user transceiver 38 and/or authentication transceiver 40, even though certain exemplary types of transceivers may be mentioned or shown herein for illustrative purposes. In still further embodiments, the user device 26 may comprise some or all of these various components in any and every possible combination, now known or later developed.

Figure 2:
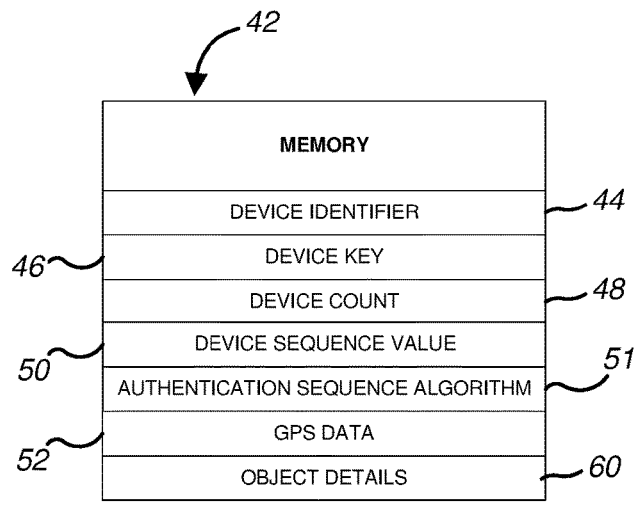
FIG. 2 is an architecture diagram of an exemplary memory data structure of an exemplary authentication device, in accordance with at least one embodiment.
Figure 5:
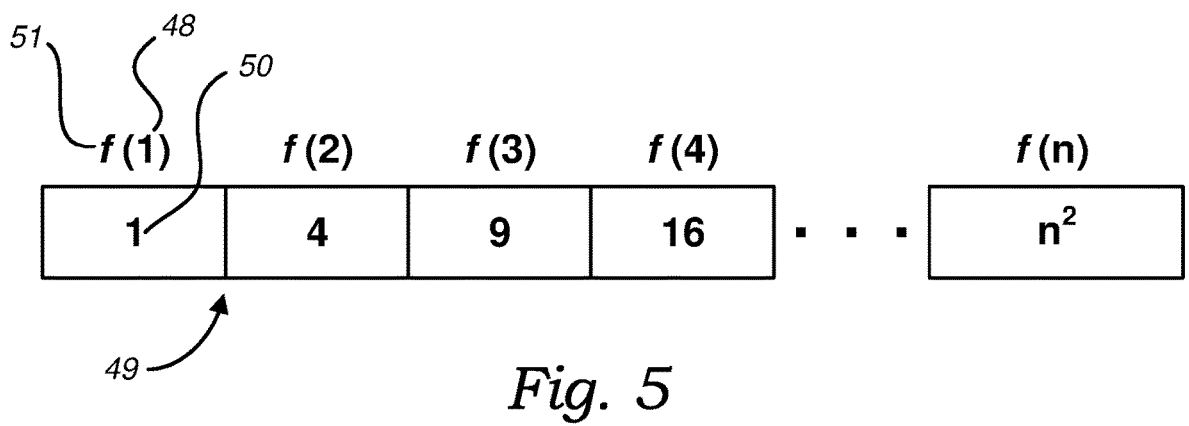
FIG. 5 is an architecture diagram of an exemplary sequence of device sequence values, in accordance with at least one embodiment.

As illustrated in the architecture diagram of FIG. 2 and discussed in greater detail below, in at least one embodiment, the at least one authentication device 28 provides a memory 42 containing at least one of a unique device identifier 44, a unique device key 46, and a device count 48 representing the number of times the authentication device 28 has been utilized to authenticate the corresponding object 22. In at least one further embodiment, the memory 42 further contains at least one of a device sequence value 50 representing a value that advances each time the authentication device 28 is utilized to authenticate the corresponding object 22 (with the advancement of the device sequence value 50 based on an authentication sequence algorithm 51—i.e., a mathematical formula—that may be unique to the authentication device 28, or unique to a select group of authentication devices 28, or unique to the object 22 itself, or unique to a select group of objects 22, or unique to the manufacturer of the object 22, or unique to the model of the object 22, or unique to GPS coordinates 52 associated with the object 22, or unique to any other data pertinent to the object 22 itself or the environment in which the object 22 is located that could be used to help authenticate the object 22. In at least one embodiment, as illustrated in FIG. 5, the authentication sequence algorithm 51 is configured such that the device sequence value 50 is a function of the device count 48—i.e., $f(n)=x$, where f is the unique authentication sequence algorithm 51, n is the device count 48, and x is the device sequence value 50. For example, where the authentication sequence algorithm 51 is $f(n)=n^2$ (as illustrated in FIG. 5), a device count 48 of "4" would equate to a device sequence value 50 of "16." Thus, as the device count 48 is advanced, the device sequence value 50 is likewise advanced (or calculated) based on the device count 48 as applied to the unique authentication sequence algorithm 51. In that regard, it should be noted that the authentication sequence algorithm 51 could be such that a sequence 49 of a plurality of device sequence values 50 doesn't necessarily result in the device sequence values 50 successively increasing; instead, in at least one embodiment, the sequence 49 could contain successive device sequence values 50 of increasing and decreasing value (e.g., 1, 40, −20, 65, −4, −10, 120, etc.). Thus, each of the unique authentication sequence algorithms 51 could be any mathematical formula now known or later developed. In still further embodiments, one or more of the unique authentication sequence algorithms 51 could generate alphanumeric device sequence values 50. In at least one alternate embodiment, the device count 48 and the device sequence value 50 are one and the same. In at least one embodiment, each of the device sequence values 50 in a given sequence 49 is calculated separately in real-time, upon an associated user of the at least one user device 26 desiring to verify the authenticity of the associated object 22 (as discussed further below), such that the associated authentication sequence algorithm 51 is stored in memory on the authentication device 28. In at least one alternate embodiment, each of the device sequence values 50 in the entire sequence 49 is calculated at the time of initiating the associated authentication device 28 and statically stored in memory 42 on said authentication device 28, thereby eliminating the need for the associated authentication sequence algorithm 51 to also be stored in memory on the authentication device 28. In at least one such embodiment, the entire sequence 49 is also stored in memory on the authentication server 24 as the corresponding server sequence values 58, as discussed below. Thus, in such embodiments, rather than the device sequence value 50 (based on the device count 48) and server sequence value 58 (based on a server count 56) being calculated in real-time for a given authentication request, the device sequence value 50 and server sequence value 58 are instead accessed in a lookup fashion based on the respective device count 48 and server count 56.

Figure 3:
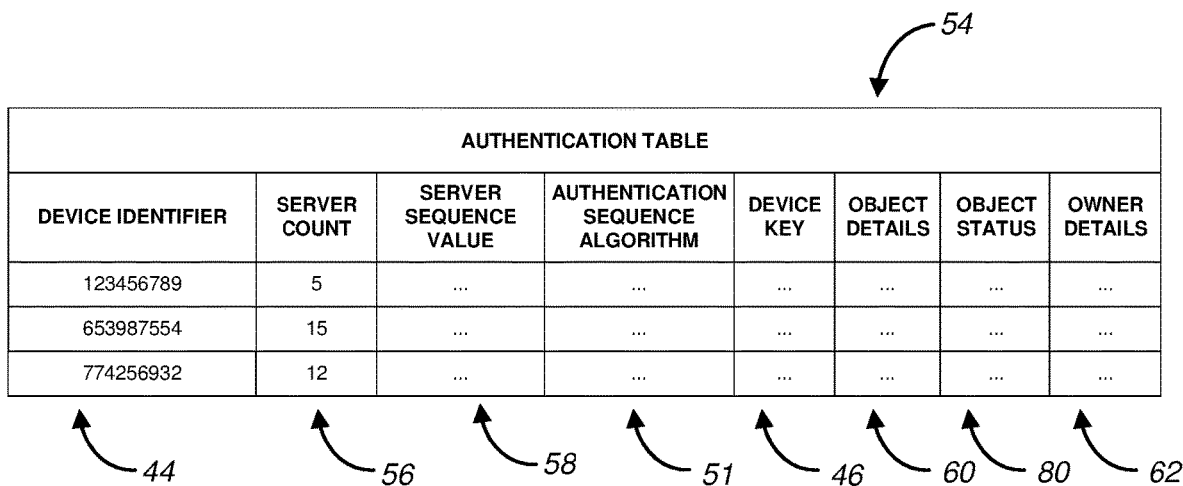
FIG. 3 is an architecture diagram of an exemplary authentication table, in accordance with at least one embodiment.

Additionally, in at least one embodiment, as illustrated in FIG. 3, the authentication server 24 provides an at least one authentication table 54 containing details related to the at least one authentication device 28, including at least one of the device identifier 44 currently associated with each of the at least one authentication device 28, a server count 56 containing the value of the device count 48 of the at least one authentication device 28 as of the latest successful authentication attempt of said authentication device 28 (as discussed further below), a server sequence value 58 corresponding to the device sequence value 50 associated with each of the at least one authentication device 28 (i.e., advanced based on the same authentication sequence algorithm 51 as the corresponding device sequence value 50), a device key 46 currently associated with each of the at least one authentication device 28 (used to decrypt or otherwise authenticate data that has previously been prepared by each of the at least one authentication device 28, as discussed further below), and one or more object details 60 associated with the corresponding object 22 associated with each of the at least one authentication device 28—including but not limited to an object serial number, a brand name, a brand logo, a model name, a photo of the object 22, etc. It should be noted that while the term "table" is used herein to describe certain exemplary data structures, in at least one embodiment, any other suitable data type or data structure, or combinations thereof, now known or later developed, capable of storing the appropriate data, may be substituted. Thus, the present invention should not be read as being so limited.

As discussed in detail below, the system 20 may be utilized in a variety of contexts, where it is desirable to allow the at least one user to verify the authenticity of the at least one object 22. It should be noted that the below described applications of the system 20 are merely exemplary and are being provided herein for illustrative purposes. As such, the system 20 and associated methods described herein should not be read as being so limited, but instead can be utilized in any context, now known or later conceived, where there is a need for verifying the authenticity of the at least one object 22.

In at least one embodiment, upon a new object 22 being registered with the system 20 (i.e., to allow the at least one user to subsequently verify the authenticity of the object 22), the authentication server 24 first creates an entry in the authentication table 54 for the associated authentication device 28, including at least one of the device identifier 44 and device key 46 of the authentication device 28, along with any desired object details 60 related to the corresponding object 22, as mentioned above. Additionally, the server count 56 associated with the authentication device 28 is initialized to be zero, while the server sequence value 58 is initialized based on the associated authentication sequence algorithm 51. In at least one embodiment, where each of the device sequence values 50 in the entire sequence 49 is calculated at the time of initiating the associated authentication device 28, the sequence 49 may also be stored in the authentication table 54 for the associated authentication device 28. In at least one embodiment, the authentication device 28 and its associated object 22 are then made available/accessible to the at least one user (such as a consumer, for example).

Figure 4:
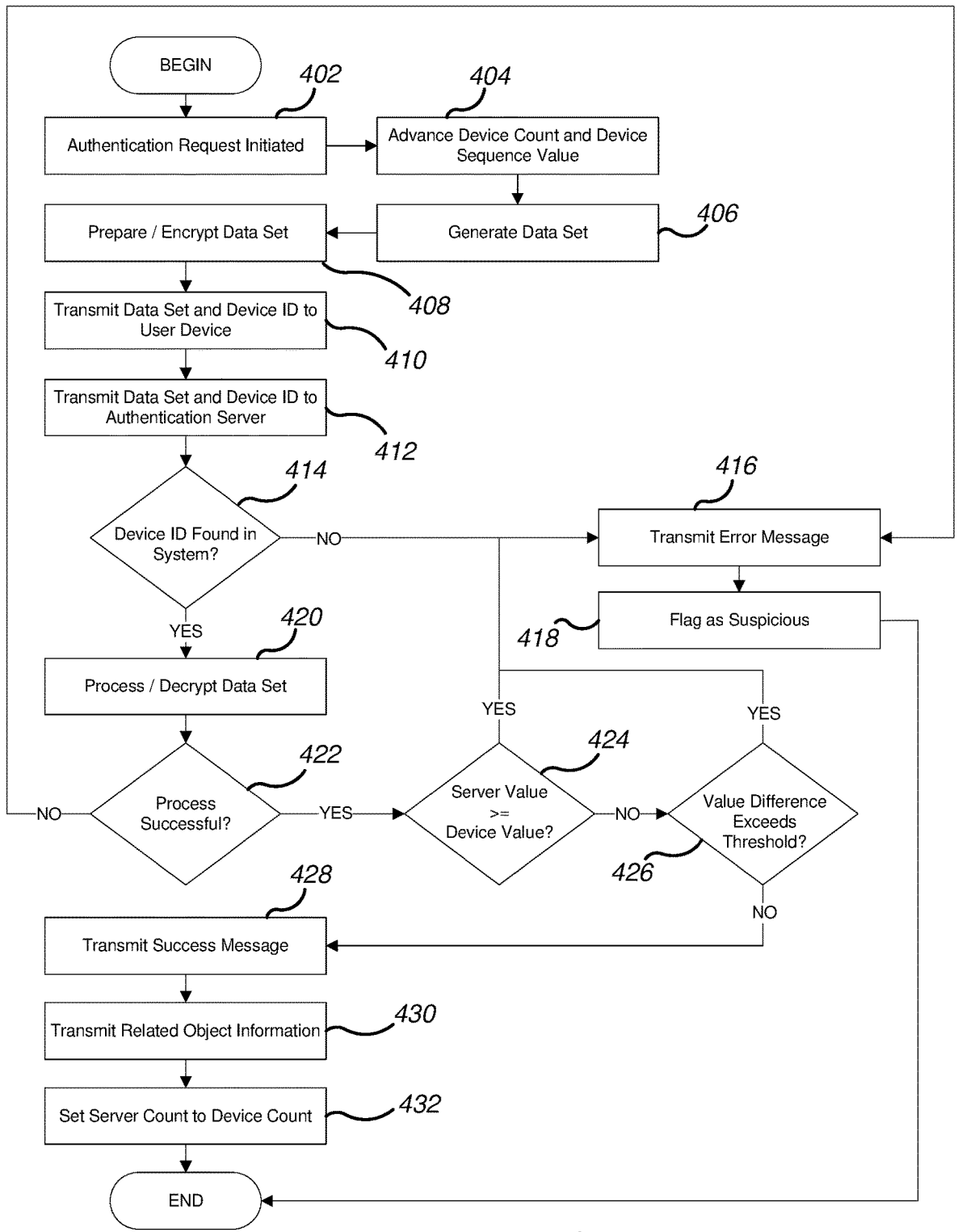
FIG. 4 is a flow diagram of an exemplary method for authenticating an at least one object, in accordance with at least one embodiment.
Figure 6:
FIGS. 6 and 7 are perspective views of an exemplary object and an exemplary authentication device, illustrating an exemplary method for authenticating said object, in accordance with at least one embodiment.

In at least one embodiment, as illustrated in the flow diagram of FIG. 4, upon an associated user of the at least one user device 26 desiring to verify the authenticity of a given object 22, the user initiates an authentication request with the associated authentication device 28 (402). In at least one such embodiment, the authentication request is initiated by the user physically interacting with a switch, button or similar type of mechanical or electronic component (hereinafter referred to generally as a "switch" 30 for simplicity purposes) provided by the authentication device 28. In at least one alternate embodiment, the authentication request is initiated by the user application 32 residing either locally in memory 34 on the at least one user device 26 or remotely on the authentication server 24, through which the user application 32 transmits a signal via the user transceiver 38 to the authentication transceiver 40. In at least one embodiment, upon the authentication device 28 receiving the authentication request, the authentication device 28 powers on—in such embodiments, the authentication device 28 only powers on when authenticating the associated object 22, and remains powered down (or, alternatively, in a low power mode) at all other times so as to conserve power. In at least one still further embodiment, the authentication device 28 is selectively powered by the user device 26 via the user transceiver 38. In at least one embodiment, upon the authentication device 28 receiving the authentication request, the authentication device 28 increments the device count 48 by one (404). In at least one embodiment, where the authentication device 28 contains a device sequence value 50 in memory 34, the authentication device 28 also advances (i.e., updates) the device sequence value 50 based on the associated authentication sequence algorithm 51 and the current device count 48, as mentioned above. The authentication device 28 then generates a data set comprising at least one of the device identifier 44, the device count 48, the device key 46, the device sequence value 50, the GPS coordinates 52, and any other pertinent data stored in memory 34 (406). Because the device count 48 and device sequence value 50 (where applicable) change after each authentication request, the resulting data set is effectively a single-use, one-time code. In at least one further embodiment, the data set further includes a message authentication code ("MAC"), such as a hash-based MAC or cipher-based MAC, for example. In at least one embodiment, the authentication device 28 then encrypts the data set using the device key 46 (408). In at least one alternate embodiment, the authentication device 28 only encrypts a portion of the data set using the device key 46. In at least one further alternate embodiment, the authentication device 28 does not encrypt the data set. In at least one alternate embodiment, the MAC is kept separate from the data set, such that the encrypted or partially encrypted data set is used to generate the MAC. The data set and the device identifier 44 (along with the MAC, where applicable) are then made available to the user application 32 (410). In at least one embodiment, the device identifier 44 is encrypted prior to being made available to the user device 32. In at least one such embodiment, the data set and the device identifier 44 (along with the MAC, where applicable) are converted into a visual code—such as a QR code or barcode, for example—and displayed via a display screen 64 provided by the authentication device 28 (FIG. 6), such that the user application 32 may subsequently obtain the visual code via a camera 66 or other image capture device provided by the user device 26. In at least one alternate embodiment, the data set and the device identifier 44 (along with the MAC, where applicable) are converted into an acoustic signal (either audible or inaudible) and produced via a speaker 68 provided by the authentication device 28, such that the user application 32 may subsequently obtain the acoustic signal via a microphone 70 or other audio capture device provided by the user device 26. In at least one further alternate embodiment, the data set and the device identifier 44 (along with the MAC, where applicable) are converted into a digital signal and transmitted from the authentication transceiver 40 to the user transceiver 38. In at least one embodiment, the data set and the device identifier 44 (along with the MAC, where applicable) are only made available to the user application 32 for a limited period of time following receipt of the authentication request. In at least one alternate embodiment, rather than the authentication device 28 generating and transmitting the data set and the device identifier 44 (along with the MAC, where applicable) for a limited period of time upon receipt of an authentication request, the authentication device 28 instead continuously provides such data upon receipt of an authentication request, via one or more of the methods described above.

In at least one embodiment, upon the user application 32 receiving the data set and the device identifier 44 (along with the MAC, where applicable), the user application 32 transmits the data set and the device identifier 44 (along with the MAC, where applicable) to the authentication server 24 (412). In at least one embodiment, before processing the data set and the device identifier 44 (along with the MAC, where applicable), the authentication server 24 first determines whether the user device 26 has authorization to access the system 20. If the user device 26 does not have authorization to access the system 20, the authentication server 24 transmits an error message to the user application 32, informing the user of the access denial. In at least one such embodiment, the authentication server 24 directs the user to install an authorized version of the user application 32 or otherwise properly register with the system 20. Once the authentication server 24 determines that the user device 26 has authorization to access the system 20 (or, alternatively, where such access authorization is not required), the authentication server 24 accesses the authentication table 54 based on the transmitted device identifier 44. In embodiments where the transmitted device identifier 44 was encrypted by the authentication device 28 (as discussed above), the authentication server 24 first decrypts the device identifier 44. If the device identifier 44 is not found in the authentication table 54 (414), the authentication server 24 transmits an error message to the user application 32 (416)—indicating that the device identifier 44 does not exist in the system 20—which is then presented to the user via the display screen 36 of the user device 26 (or via audible cues, tactile cues, or any other form of feedback, now known or later developed in at least one further embodiment). Otherwise, in at least one embodiment, if the device identifier 44 is found in the authentication table 54 (414), the authentication server 24 obtains the device key 46 associated with the device identifier 44, and uses the device key 46 to process the data set (420). In at least one such embodiment, processing the data set involves decrypting the data set (or at least any portions of the data set that have been encrypted) using the device key 46. In at least one alternate embodiment, where a MAC was transmitted, processing the data set involves using the device key 46 (or a different key, in at least one further embodiment) to authenticate the MAC. If processing of the data set is unsuccessful (422)—i.e., if the decrypted data set is an indecipherable sequence of bits or, alternatively, if the associated MAC cannot be authenticated—the authentication server 24 transmits an error message to the user application 32 (416)—indicating that the authentication of the associated object 22 has failed—which is then presented to the user via the display screen 36 of the user device 26 (or via audible cues, tactile cues, or any other form of feedback, now known or later developed in at least one further embodiment). In at least one further embodiment, if the processing of the data set is unsuccessful, the authentication server 24 further flags the device identifier 44 in the authentication table 54 as being suspicious (418), or alternatively locks the device identifier 44 temporarily or permanently. In at least one such embodiment, details associated with unsuccessful authentication attempts are stored by the authentication server 24 in an authentication attempts table, with said table containing select details including at least one of the device identifier 44 currently associated with each of the at least one authentication device 28 that has had an unsuccessful authentication attempt, the data set associated with each unsuccessful authentication attempt, and select details associated with user device 26 from which each unsuccessful authentication attempt originated. Based on these details, in at least one embodiment, the authentication server 24 is capable of determining whether a given authentication device 28, device identifier 44 and/or user device 26 should be flagged or locked as being suspicious. In at least one further embodiment, the authentication attempts table also stores details associated with successful authentication attempts.

In at least one embodiment, if the processing of the data set is successful (422), the authentication server 24 obtains the server count 56 associated with the device identifier 44 and compares the server count 56 against the device count 48. The server count 56 value represents the device count 48 value that was stored by the authentication server 24 after the last successful authentication of the associated object 22, prior to the current authentication attempt. As such, if the object 22 is authentic, then the associated device count 48 will be higher than the server count 56. In at least one embodiment, if the processing of the data is successful (422), the authentication server 24 obtains (or calculates) the server sequence value 58 associated with the device identifier 44, based on the provided device count 48, and compares the server sequence value 58 against the provided device sequence value 50. If the server sequence value 58 does not match the provided device sequence value 50 (meaning that the provided device sequence value 50 was not generated using the correct authentication sequence algorithm 51), the authentication server 24 transmits an error message to the user application 32 (416)—indicating that the authentication of the associated object 22 has failed—which is then presented to the user via the display screen 36 of the user device 26 (or via audible cues, tactile cues, or any other form of feedback, now known or later developed in at least one further embodiment). In at least one alternate embodiment, only the device sequence value and not the device count is needed. In at least one further embodiment, if the processing of the data is successful (422), the authentication server 24 obtains (or calculates) the server sequence value 58 associated with the device identifier 44, based on the server count 56, and compares the server sequence value 58 against the provided device sequence value 50. The server sequence value 58 represents the device sequence value 50 that was stored by the authentication server 24 after the last successful authentication of the associated object 22, prior to the current authentication attempt. As such, if the object 22 is authentic, then the associated device sequence value 50 will be at least one value later in the associated sequence 49 (based on the underlying authentication sequence algorithm 51 used to advance each of the device sequence value 50 and server sequence value 58) than the server sequence value 58. In at least one still further embodiment, the authentication server 24 utilizes both the server count 56 and the server sequence value 58. If the authentication server 24 determines that the server count 56 is greater than or equal to the device count 48, or that the server sequence value 58 is one or more values later in the associated sequence 49, or in the same position in the sequence 49, as compared to the device sequence value 50 (424), the authentication server 24 transmits an error message to the user application 32 (416)—indicating that the authentication of the associated object 22 has failed—which is then presented to the user via the display screen 36 of the user device 26 (or via audible cues, tactile cues, or any other form of feedback, now known or later developed in at least one further embodiment). In at least one further embodiment, if the authentication has failed, the authentication server 24 further flags the device identifier 44 in the authentication table 54 as being suspicious (418), or alternatively locks the device identifier 44 temporarily or permanently. Otherwise, if the authentication server 24 determines that the server count 56 is less than the device count 48, or that the device sequence value 50 is later in the associated sequence 49 than the server sequence value 58 (424), the authentication server 24 transmits a success message to the user application 32 (428)—indicating that the authentication of the associated object 22 has succeeded—which is then presented to the user via the display screen 36 of the user device 26 (or via audible cues, tactile cues, or any other form of feedback, now known or later developed in at least one further embodiment). Additionally, in at least one embodiment, the server count 56 value is set to be equal to the device count 48 (432), and the server sequence value 58 is set to be equal to the device sequence value 50 (where applicable). In at least one further embodiment, if the authentication server 24 determines that the device count 48 is greater than the server count 56, or that the device sequence value 50 is later in the associated sequence 49 than the server sequence value 58 (where applicable) (424), but further determines that the difference between the device count 48 and the server count 56, or between the relative positions (i.e., addresses) of the server sequence value 58 and the device sequence value 50 in the associated sequence 49 (where applicable) exceeds a pre-defined threshold (426), the authentication server 24 transmits an error message to the user application 32 (416)—indicating that the authentication of the associated object 22 has failed or is otherwise questionable—which is then presented to the user via the display screen 36 of the user device 26 (or via audible cues, tactile cues, or any other form of feedback, now known or later developed in at least one further embodiment). In at least one further embodiment, if the authentication has failed, the authentication server 24 further flags the device identifier 44 in the authentication table 54 as being suspicious (418), or alternatively locks the device identifier 44 temporarily or permanently. In embodiments where the encrypted data includes a MAC, the MAC may be used by the authentication server 24 to verify the identity of the authentication device 28 and the integrity of the data set. In still further embodiments that utilize a MAC, the data set (including the MAC) and device identifier 44 may be unencrypted or partially encrypted when transmitted to the user application 32, and subsequently transmitted to the authentication server 24. In still further embodiments, select portions of the data set may be encrypted, while other portions of the data set remain unencrypted.

Figure 7:
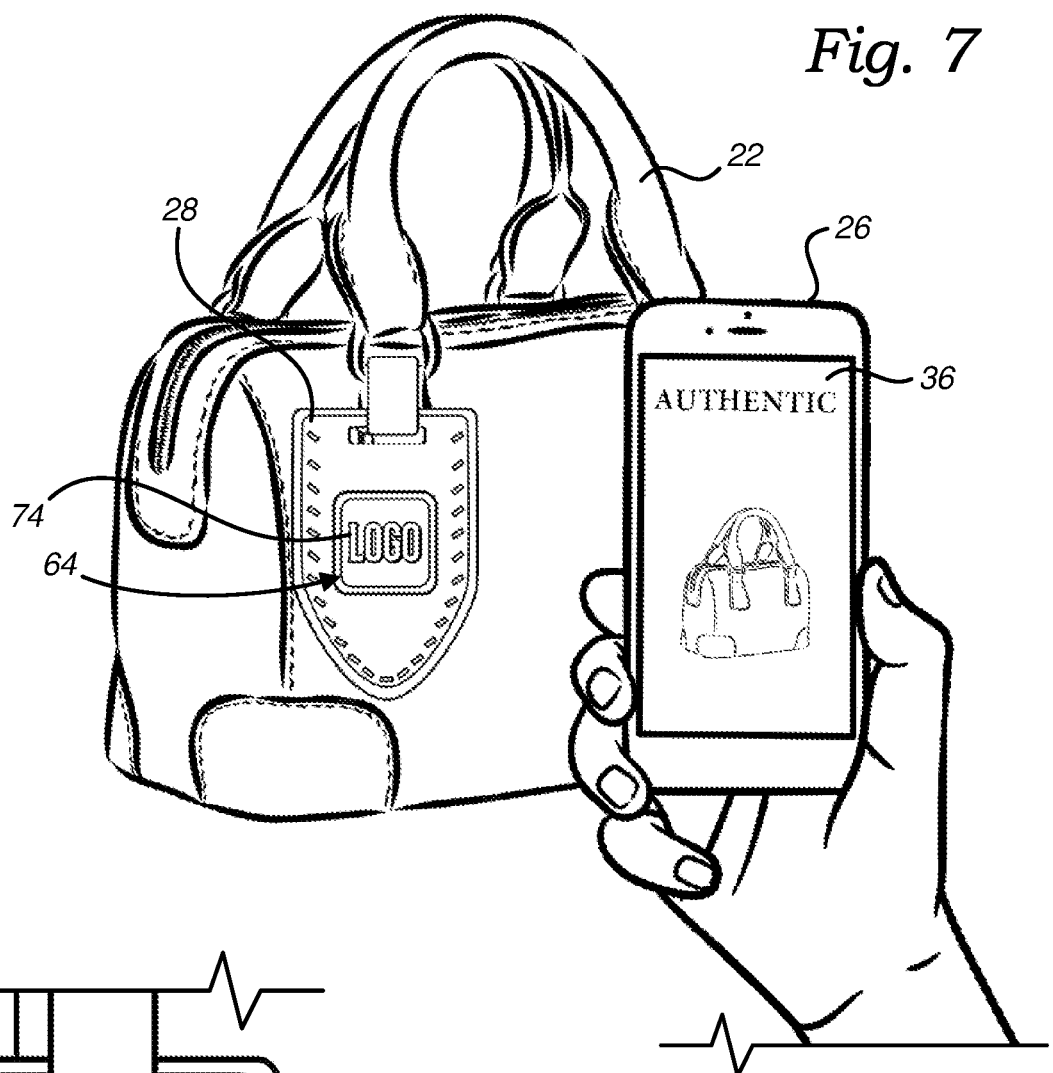

In at least one embodiment, in addition to the user application 32 receiving a "success" or "failure" notification related to the authentication of the object 22, the user application 32 may receive further details (430) including, but not limited to, one or more of timestamps of previous successful, or unsuccessful, authentication attempts, GPS coordinates of previous successful, or unsuccessful, authentication attempts, data recorded during previous successful or unsuccessful authentication attempts, images of the object 22 being authenticated, details of the object's 22 purchase, and additional object details 60 or brand/manufacturer information, which may then be displayed by the display screen 36 of the user device 26. Accordingly, in at least one such embodiment, as illustrated in FIG. 7, the user is able to visually compare the displayed information against the object 22 to which the authentication device 28 is attached—and if the information corresponds to the object 22, then the authenticity of the object 22 has been further verified. Such visual comparison data better protects against scenarios in which a bad actor removes a legitimate authentication device 28 from one object 22 and surreptitiously attaches it to a different object 22 in hopes of tricking the system 20 into authenticating that different object 22. In such a scenario, while the authentication server 24 might transmit a "success" message to the corresponding user application 32, because the identifying details associated with the object 22 would also be transmitted to the user application 32 (and displayed on the display screen 36 of the user device 26), the user would quickly realize that the identifying details associated with the "authenticated" object 22 displayed on the display screen 36 (i.e., the identifying details associated with the object 22 to which the authentication device 28 was originally attached) does not match the actual object 22 the user was attempting to authenticate.

As mentioned above, in at least one embodiment, the additional object details 60 associated with the at least one object 22 may include one or more of an object serial number, a brand name, a brand logo, a model name, a photo of the object 22, etc. In at least one further embodiment, the additional object details 60 may further include one or more of images, letters, numbers, icons, signatures, graphics, artwork, audible sounds, etc., with these object details 60 configured for being selectively unlocked for display on the display screen 64 (or audibly produced via the speaker 68, in the case of audible sounds) of the associated authentication device 28, as illustrated in FIG. 7. In at least one such embodiment, these object details 60 are statically stored in memory 42 on the associated authentication device 28 at the time of initiating the authentication device 28 (such as by the manufacturer or original owner of the object 22, for example).

Figure 9:
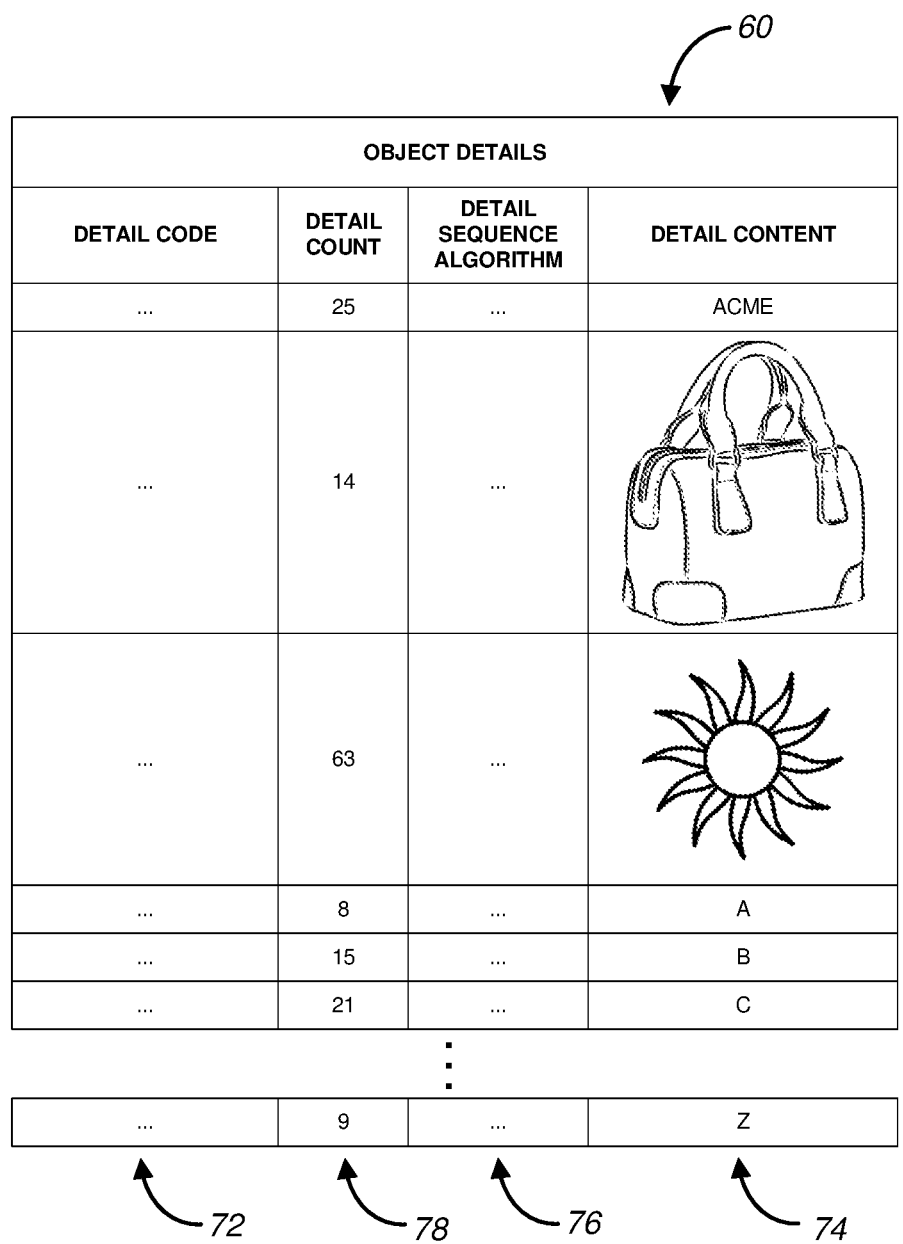
FIG. 9 is an architecture diagram of an exemplary object detail table, in accordance with at least one embodiment.

In at least one embodiment, the at least one authentication device 28 statically stores a plurality of object details 60 in memory 42, with each object detail 60 configured for being unlocked by a different detail code 72. In at least one embodiment, as illustrated in FIG. 9, each object detail 60 comprises an associated detail code 72 and a detail content 74 containing the specific detail to be produced by the associated authentication device (e.g., an object serial number, a brand name, a brand logo, a model name, a photo of the object 22, images, letters, numbers, icons, signatures, graphics, artwork, audible sounds, etc.). In at least one embodiment, each detail code 72 may be configured as an alphanumeric string, a touch pattern, biometrics, an acoustic signal (either audible or inaudible), or any other type of code—now known or later developed—that is capable of being distinguished from other detail codes 72 so as to be associated with a one of the object details 60. In at least one embodiment, the authentication device 28 is capable of producing (i.e., visually displaying and/or audibly producing) the detail content 74 of a plurality of object details 60 simultaneously, upon the authentication device 28 receiving the appropriate detail codes 72 for each of the object details 60. Accordingly, in at least one such embodiment, the authentication device 28 statically stores a separate object detail 60 for each number and each letter in the alphabet, thereby allowing for the selective generation of custom numbers and/or words to be displayed by the display screen 64 of the associated authentication device 28. For example, to display the word "JANE" on the display screen 64, the authentication device 28 would display the detail content 74 for each of the letters "J", "A", "N", and "E" on the display screen 64 in that order, upon the authentication device 28 receiving the corresponding detail codes 72, of course. In at least one further embodiment, the authentication device 28 stores a further detail code 72 in memory 42 that is configured for temporarily unlocking an alphanumeric input mode, whereby a desired string of alphanumeric characters (such as "JANE" for example) can be subsequently input via a manual input peripheral 82 (discussed below). In other words, using the same example, when the authentication device 28 enters the alphanumeric input mode (after receiving the detail code 72 associated with the alphanumeric input mode), the user is able to manually input the letters "J", "A", "N", and "E" via the manual input peripheral 82 rather than the longer detail codes 72 for each of the letters "J", "A", "N", and "E." As another example, in at least one embodiment, the authentication device 28 statically stores individual images and/or graphical components as separate object details 60, thereby allowing for the selective generation of more complex images to be displayed by the display screen 64 of the associated authentication device 28 by inputting the desired combination of corresponding detail codes 72 for the desired images and/or graphical components to be displayed simultaneously.

Figure 8:
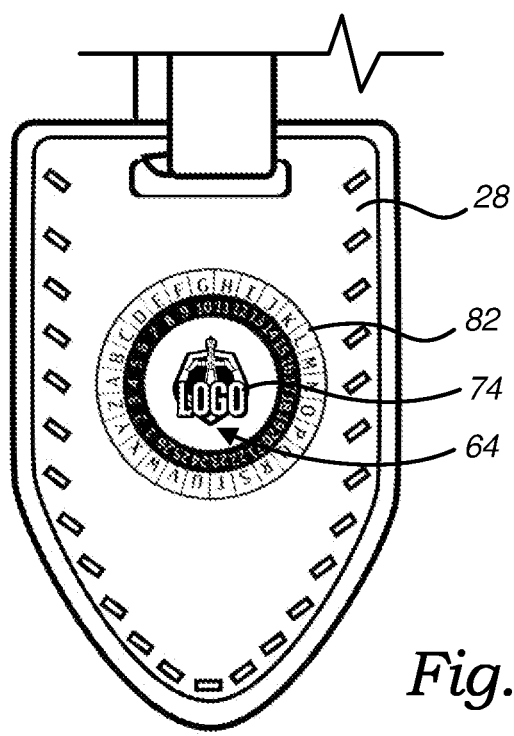
FIG. 8 is a perspective view of a further exemplary authentication device, in accordance with at least one embodiment.

In at least one embodiment, as illustrated in FIG. 8, the detail codes 72 are configured for being manually transmitted to the at least one authentication device 28 via a manual input peripheral 82 provided by the authentication device 28. In at least one embodiment, the manual input peripheral 82 is one of a keyboard or set of buttons (such as a physical keyboard or a touch screen keyboard provided by the display screen 64 of the authentication device 28), a dial or rotatable bezel, a scroll wheel, a touch screen input, or any other type of mechanism—now known or later developed—that is capable of allowing the user to manually input the desired detail codes 72. In at least one alternate embodiment, the detail codes 72 are capable of being remotely transmitted to authentication device 28 by the user application 32 residing either locally in memory 34 on the at least one user device 26 or remotely on the authentication server 24, through which the user application 32 transmits a signal via the user transceiver 38 to the authentication transceiver 40. In at least one such embodiment, the user application 32 provides a similar alphanumeric input mode as described above. In at least one such embodiment, the user application 32 allows the user to manually input the desired string of alphanumeric characters into the user application 32 (such as "JANE" for example), and the user application 32 subsequently translates the alphanumeric string into the corresponding detail codes 72 for each alphanumeric character in the string, then transmits those detail codes 72 to the authentication device 28.

As mentioned above, in at least one embodiment, the process of authenticating the at least one object 22 may also involve authenticating the current ownership of the at least one object 22. In at least one such embodiment, as illustrated in FIG. 3, the at least one authentication table 54 contains owner details 62 related to the current owner of the object 22 associated with a given at least one authentication device 28, including at least one of an owner name, an owner mailing address, an owner email address, an owner phone number, an owner photo, an owner signature, and a date of acquisition containing the date on which the owner acquired ownership of the object. Accordingly, in at least one such embodiment, in addition to the user application 32 receiving a "success" or "failure" notification related to the authentication of the object 22, the user application 32 may receive select owner details 62 to be displayed by the display screen 36 of the user device 26. Additionally, in at least one embodiment, the authentication table 54 contains similar owner details 62 for all previous owners of the object 22 associated with a given at least one authentication device 28, thereby maintaining an up-to-date chain of title for the object 22.

In at least one embodiment, the current owner of the object 22 associated with a given at least one authentication device 28 is provided access to the authentication server 24 via the user application 32 or an online portal hosted by the authentication server 24, either in addition to or in lieu of the user application 32. In at least one embodiment, through that access to the authentication server 24, the current owner is able to view one or more of the detail codes 72 associated with the authentication device 28. Thus, in at least one embodiment, where the current owner is the owner of a plurality of objects 22 having associated authentication devices 28, the current owner is able to view the detail codes 72 associated with each such authentication device 28. In at least one embodiment, the current owner is only able to view a subset of all detail codes 72 associated with the authentication device 28, with the remaining detail codes 72 being either permanently or temporarily hidden from the current owner. For example, in at least one such embodiment, one or more detail codes 72 might only be accessible to the original manufacturer of the object 22, thereby giving the original manufacturer the exclusive ability to access select object details 60 for subsequent production by the authentication device 28 (via the display screen 64 and/or speaker 68). As another example, in at least one such embodiment, one or more detail codes 72 might only be made available to the current owner upon occurrence of a triggering event—e.g., after the current owner has owned the object 22 for a pre-defined period of time, on the current owner's birthday, after the current owner acquires ownership over a pre-defined quantity of objects 22, etc. As yet another example, in at least one such embodiment, one or more detail codes 72 might only be made available to a particular owner, thereby giving said owner the exclusive ability to access select object details 60 for subsequent production by the authentication device 28. In such embodiments, upon ownership of the associated object 22 being transferred to a new owner, such owner-specific detail codes 72 would not be transferred, but would instead remain with the owner to which the detail codes 72 had been assigned (unless said owner desires to transfer one or more of the owner-specific detail codes 72, in at least one such embodiment).

In that regard, in at least one embodiment, the authentication server 24 (via the user application 32 and/or an online portal hosted by the authentication server 24) allows the current owner of a given object 22 to transfer ownership of the object 22 (along with the associated authentication device 28) to a new owner. In at least one such embodiment, transferring ownership of a given object 22 and its associated authentication device 28 entails the transferring owner updating the at least one authentication table 54 to include the owner details 62 associated with the new owner, thereby removing the transferring owner as the current owner of the object 22. In at least one embodiment, access to any unlocked detail codes 72 associated with the object 22 (other than any detail codes 72 that are specific to the transferring owner, as noted above) is also made available to the new owner.

In at least one embodiment, the authentication server 24 (via the user application 32 and/or an online portal hosted by the authentication server 24) provides an at least one marketplace for facilitating the transfers of (and transactions relating to) the objects 22 which, in turn, helps to maintain an up-to-date chain of title for the objects 22. In at least one embodiment, the authentication server 24 provides a single marketplace for all objects 22. In at least one alternate embodiment, the authentication server 24 provides a plurality of marketplaces, with each such marketplace reserved for a subset of the objects 22—for example, separate marketplaces for different geographic areas in which users or objects 22 are located, separate marketplaces for different brands or manufacturers of objects 22, etc. In at least one embodiment, chain of title for each object 22 is stored in the at least one authentication table 54. However, in at least one alternate embodiment, chain of title for each object 22 is stored in a separate private ledger system or decentralized blockchain ledger.

In at least one embodiment, each object detail 60 is statically stored in memory 42 on the associated authentication device 28, such that no data is written to the authentication device 28 after it has been initialized. In at least one embodiment, the object details 60 are also stored in the at least one authentication table 54. In at least one embodiment, the detail code 72 associated with each object detail 60 is static. In at least one alternate embodiment, one or more of the detail codes 72 are dynamic rather than static. In at least one such alternate embodiment, one or more of the detail codes 72 is dynamically set based on a corresponding detail sequence algorithm 76—i.e., a mathematical formula—that may be unique to the authentication device 28, or unique to a select group of authentication devices 28, or unique to the object 22 itself, or unique to a select group of objects 22, or unique to the manufacturer of the object 22, or unique to the model of the object 22, or unique to the associated object detail 60, or unique to any other data pertinent to the object 22 itself or the environment in which the object 22 is located.

In at least one embodiment, similar to the authentication sequence algorithm 51 discussed above, each detail sequence algorithm 76 is configured such that the corresponding dynamic detail code 72 is a function of a corresponding detail count 78—i.e., $f(n)=x$, where f is the detail sequence algorithm 76, n is the detail count 78, and x is the detail code 72. For example, where the detail sequence algorithm 76 is $f(n)=n^2$, a detail count 78 of "4" would equate to a detail code 72 of "16." Thus, as the detail count 78 is advanced, the detail code 72 is likewise advanced (or calculated) based on the detail count 78 as applied to the associated detail sequence algorithm 76. In at least one further embodiment, each detail sequence algorithm 76 is configured such that the corresponding dynamic detail code 72 is a function of one or both of a corresponding detail count 78 and the device key 46 of the associated authentication device 28. In at least one still further embodiment, each detail sequence algorithm 76 is configured such that the corresponding dynamic detail code 72 is a function of a seed value that is generated (randomly or otherwise) by the associated authentication device 28 and transmitted to the authentication server 24. In that regard, it should be noted that the detail sequence algorithm 76 could be such that a sequence of a plurality of detail codes 72 doesn't necessarily result in the detail codes 72 successively increasing; instead, in at least one embodiment, the sequence could contain successive detail codes 72 of increasing and decreasing value (e.g., 1, 40, −20, 65, −4, −10, 120, etc.). Thus, each of the detail sequence algorithms 76 could be any mathematical formula now known or later developed. In still further embodiments, one or more of the detail sequence algorithms 76 could generate alphanumeric detail codes 72. In at least one alternate embodiment, the detail count 78 and the detail code 72 are one and the same. In at least one embodiment, each of the detail codes 72 in a given sequence is calculated separately in real-time, upon the occurrence of a triggering event (as discussed further below), such that the associated detail sequence algorithm 76 is stored in memory on the authentication device 28. In at least one alternate embodiment, each of the detail codes 72 in the entire sequence is calculated at the time of initiating the associated authentication device 28 and statically stored in memory 42 on said authentication device 28, thereby eliminating the need for the associated detail sequence algorithm 76 to also be stored in memory on the authentication device 28. In at least one such embodiment, the entire sequence of detail codes 72 is also stored in memory on the authentication server 24. Thus, in such embodiments, rather than the detail code 72 being calculated (based on the detail count 78) in real-time upon the occurrence of a triggering event, the detail code 72 is instead accessed in a lookup fashion based on the detail count 78. In at least one embodiment, when a given authentication device 28 is first initialized, the detail count 78 associated with each object detail 60 of the authentication device 28 is initialized to be zero, while the detail code 72 is initialized based on the associated detail sequence algorithm 76. In at least one embodiment, where each of the detail codes 72 in the entire sequence is calculated at the time of initiating the associated authentication device 28, the sequence of detail codes 72 may also be stored in the authentication table 54 for the associated authentication device 28.

In at least one embodiment, the detail codes 72 are updated periodically or upon the occurrence of a triggering event for increased security on the associated authentication device 28. For example, in at least one embodiment, the detail codes 72 are updated each time an authentication request is initiated with the associated authentication device 28, as described above. In at least one such embodiment, the detail count 78 of each object detail 60 may contain the same value as the device count 48 of the associated authentication device 28. As another example, in at least one embodiment, the detail codes 72 are updated at pre-defined time-based intervals (e.g., every day, every week, every month, etc.), or after a pre-defined quantity of authentication requests (e.g., every 10 authentication requests, etc.). As another example, in at least one embodiment, the detail codes 72 are updated at random. As another example, in at least one embodiment, the detail code 72 for a given object detail 60 is updated upon that detail code 72 being transmitted to the associated authentication device 28. As another example, in at least one embodiment, the detail codes 72 are updated upon a specialized "reset" detail code 72 being transmitted to the associated authentication device 28. In further embodiments, any other types of triggering events, now known or later conceived, may be implemented.

In at least one embodiment, upon a given authentication device 28 updating a given detail code 72, the new detail code 72 is transmitted to the authentication server 24 to be stored in the at least one authentication table 54. In at least one alternate embodiment, where the corresponding detail sequence algorithm 76 is also stored in the at least one authentication table 54, the new detail count 78 may instead be transmitted to the authentication server 24, such that the authentication server 24 may then use the corresponding detail sequence algorithm 76 to calculate the new detail code 72, which is then stored in the at least one authentication table 54. Accordingly, in at least one embodiment, when the current owner of a given object 22 desires to have the associated authentication device 28 produce a particular detail content 74 (or a combination of detail contents 74), the current owner is able to access the associated detail code(s) 72 via the user application 32 and/or an online portal hosted by the authentication server 24, and then transmit the detail code(s) 72 to the authentication device 28, as described above.

In at least one embodiment, as illustrated in FIG. 3, the at least one authentication table 54 contains an object status 80 for each of the at least one authentication device 28 containing a status identifier related to the current state of the associated object 22—e.g., "lost," "stolen," "tampered," "good," etc. In at least one such embodiment, upon the current owner losing a given object 22, the current owner is able to manually set the object status 80 value of the associated authentication device 28 to "lost" or "stolen" via the user application 32 or an online portal hosted by the authentication server 24, which may then be transmitted from the authentication server 24 (or from the user application 32 of a user device 26 in communication with the authentication device 28) to the authentication device 28. As a result, in at least one such embodiment, the associated authentication device 28 is capable of producing a "lost" or "stolen" alert via the display screen 64 (i.e., a visual alert) and/or speaker 68 (i.e., an audible alert), or via some other signal or beacon (now known or later developed) until the object status 80 value of the authentication device 28 is changed back to "good." In at least one further such embodiment, the associated authentication device 28 is configured for locking itself down and disabling select detail codes 72 until the object status value 80 of the authentication device 28 is changed back to "good." Additionally, in at least one embodiment, the user application 32 is capable of producing a "lost" or "stolen" alert via the display screen 36 and/or a speaker 71 of the user device 26 during any authentication attempts of the associated object 22, and may also display the contact information of the current owner or transmit the current GPS data 52 of the authentication device 28 and/or the current GPS data 52 of the user device that initiated the authentication attempt to the user device of the current owner (or alternatively, to one or more other communication channels that are accessible via the user device, such as email, text messaging, voice messaging, etc.—for simplicity purposes, all such direct and indirect transmissions are referred to herein as being transmitted to the user device or the current owner). Similar types of alerts may be produced upon the object status 80 value being changed to "tampered"—for example, where the authentication server 24 flags the authentication device 28 based on a suspicious authentication attempt, as described above. In another embodiment, the object status 80 value for a given authentication device 28 might be automatically changed to "tampered" by the authentication server 24 (or, alternatively, by the authentication device 28) upon the input of a pre-defined quantity of invalid detail codes 72 into the authentication device 28. In at least one further embodiment, the object status 80 value for a given authentication device 28 might be automatically changed to "tampered" by the authentication device 28 upon the authentication device 28 detecting a physical tampering (such as an actual or attempted breach of a housing of the authentication device 28, an actual or attempted breach or manipulation of the internal software or circuitry of the authentication device 28, etc.).

In at least one embodiment, the object status 80 value of the associated authentication device 28 is subsequently changed back to "good" upon a valid detail code 72 being transmitted to the authentication device 28. In at least one embodiment, upon the object status 80 value of the associated authentication device 28 being changed to "lost," "stolen," or "tampered," the associated detail codes 72 are updated as described above. Additionally, in at least one embodiment, upon the object status 80 value of the associated authentication device 28 being changed back to "good," the associated detail codes 72 are updated as described above. Similarly, in at least one embodiment, upon the associated object 22 being transferred to a new owner, the associated detail codes 72 are updated as described above.

In at least one embodiment, one or more of the detail content 74 associated with a given authentication device 28 (such as any images, for example) have digital counterparts that are recorded and stored in a separate private ledger system or decentralized blockchain ledger containing non-fungible tokens ("NFT"), utility tokens and/or fungible tokens. In at least one embodiment, the digital counterpart is an identical representation of the corresponding detail content 74. In at least one alternate embodiment, the digital counterpart is simply related to the corresponding detail content 74—for example, the digital counterpart may comprise associated music, audio, film, certificates, and other items authorized by the manufacturer of the associated object 22. In at least one embodiment, when the current owner of the associated object 22 is given access to a new detail code 72 (as described above), a corresponding NFT of the associated detail content 74 is added or otherwise transferred to a digital wallet owned by the current owner. In at least one embodiment, upon the associated object 22 being transferred to a new owner, one or more of the corresponding digital counterparts may also be transferred to a digital wallet owned by the new owner—either automatically or upon the transferring owner's election. Additionally, in at least one embodiment, where one or more digital counterparts are related to detail codes 72 that are owner-specific (as discussed further above), upon ownership of the associated object 22 being transferred to a new owner, such owner-specific digital counterparts (along with the corresponding owner-specific detail codes 72) would not be transferred, but would instead remain with the owner to which the detail codes 72 had been assigned (unless said owner desires to transfer one or more of the owner-specific detail codes 72 and corresponding digital counterparts, in at least one such embodiment). In at least one embodiment, upon release of a given digital counterpart on the authentication device 28, the user application 32 prompts for a scan via the camera 66 of the user device 26 of a visual code (such as a QR code, for example) which contains an encoded notification to the system 20 that a further step needs to be taken to complete the transfer of the digital counterpart on the associated separate private ledger system or decentralized blockchain ledger.

Aspects of the present specification may also be described as the following embodiments:

1. A method for authenticating physical or digital objects, the method comprising the steps of: implementing an authentication server configured for receiving and processing data related to the objects; initiating a plurality of authentication devices, each of the authentication devices associated with a one of the objects, each of the authentication devices configured for storing at least one of a unique device identifier, a unique device key, a device count which increments each time said authentication device is utilized to authenticate the corresponding object with which said authentication device is associated, a sequence of device sequence values corresponding to the incrementing device count values and generated based on an authentication sequence algorithm unique to at least one of said authentication device, a select group of authentication devices, the corresponding object with which said authentication device is associated, or a select group of objects, as compared to other ones of the authentication devices or objects with which other ones of the authentication devices are associated, each of the unique device identifier, unique device key, and unique authentication sequence algorithm associated with each of the authentication devices being set by the authentication server upon each said authentication device being initiated; maintaining an at least one authentication table in communication with the authentication server, the at least one authentication table containing, for each of the authentication devices, the device identifier of said authentication device, the authentication sequence algorithm associated with said authentication device for generating a sequence of server sequence values identical to the sequence of device sequence values, and the device key currently associated with said authentication device; implementing a user application residing in memory on an at least one user device under the control of an at least one user, the at least one user device in selective communication with each of the authentication server and the at least one authentication device; and upon an attempt to authenticate a one of the objects via a one of the at least one user device: initiating an authentication request with the associated authentication device; the authentication device incrementing the device count and advancing the device sequence value corresponding to the device count and the authentication sequence algorithm associated with the authentication device; the authentication device generating a data set comprising the device sequence value; the authentication device providing the data set and the device identifier to the user application corresponding to said one of the at least one user device; the user application transmitting the data set and the device identifier to the authentication server; the authentication server accessing the authentication table based on the transmitted device identifier; upon the authentication server determining that the transmitted device identifier does not match any of the device identifiers stored in the at least one authentication table, the authentication server transmitting an error message to the user application; upon the authentication server locating the transmitted device identifier in the at least one authentication table: the authentication server obtaining the server sequence value associated with the transmitted device identifier; upon the authentication server determining that the device sequence value is earlier in the sequence than the server sequence value, or in the same position in the sequence as the server sequence value, the authentication server transmitting an error message to the user application; and upon the authentication server determining that the device sequence value is later in the sequence than the server sequence value: the authentication server transmitting a success message to the user application; and the authentication server setting the server sequence value to be equal to the device sequence value; whereby, during said attempt to authenticate said object via said user device, no data is transmitted or written to the authentication device associated with said object by either said user device or the authentication server.

2. The method according to embodiment 1, wherein the step of the authentication device providing the data set and the device identifier to the user application, further comprises the steps of: the authentication device encrypting an at least one portion of the data set using the device key; the authentication server obtaining the device key associated with the transmitted device identifier; the authentication server attempting to process the data set using the device key; and upon the authentication server determining that processing the data set was unsuccessful, the authentication server transmitting an error message to the user application.

3. The method according to embodiments 1-2, wherein the step of the authentication server attempting to process the data set using the device key, further comprises the step of decrypting the encrypted portions of the data set using the device key.

4. The method according to embodiments 1-3, wherein the step of initiating an authentication request with the associated authentication device further comprises the step of interacting with a switch provided by the authentication device.

5. The method according to embodiments 1-4, wherein the step of initiating an authentication request with the associated authentication device further comprises the step of the user application transmitting a signal via a user transceiver provided by the user device, said signal subsequently being received by an authentication transceiver provided by the authentication device.

6. The method according to embodiments 1-5, further comprising the step of, upon the authentication device receiving the authentication request, the authentication device automatically powering on.

7. The method according to embodiments 1-6, further comprising the step of, upon the authentication device providing the encrypted data set and the device identifier to the user application, the authentication device automatically transitioning into one of a powered down state or low power state.

8. The method according to embodiments 1-7, wherein the step of the authentication device providing the data set and the device identifier to the user application further comprises the steps of: the authentication device converting the data set and the device identifier into a visual code; the authentication device displaying the visual code via a display screen provided by the authentication device; and the user application obtaining the visual code via a camera provided by the user device.

9. The method according to embodiments 1-8, wherein the step of the authentication device providing the data set and the device identifier to the user application further comprises the steps of: the authentication device converting the data set and the device identifier into an acoustic signal; the authentication device producing the acoustic signal using a speaker provided by the authentication device; and the user application obtaining the acoustic signal via a microphone provided by the user device.

10. The method according to embodiments 1-9, wherein the step of the authentication device providing the data set and the device identifier to the user application further comprises the steps of: the authentication device converting the data set and the device identifier into a digital signal; the authentication device transmitting the digital signal using an authentication transceiver provided by the authentication device; and the user application obtaining the digital signal via a user transceiver provided by the user device.

11. The method according to embodiments 1-10, wherein the step of determining that the device sequence value is later in the sequence than the server sequence value further comprises a step of, upon the authentication server determining that a difference between the relative positions of the device sequence value and the server sequence value within the sequence exceeds a pre-defined threshold value, the authentication server transmitting an error message to the user application.

12. The method according to embodiments 1-11, wherein the step of the authentication server determining that the device sequence value is later in the sequence than the server sequence value, further comprises the step of the authentication server transmitting select details related to said object, as stored in the at least one authentication table, to the user application.

13. The method according to embodiments 1-12, wherein the step of the authentication server determining that the device sequence value is later in the sequence than the server sequence value further comprises the steps of: the authentication server transmitting select object details related to said object, as stored in the at least one authentication table, to the user application, said object details comprising at least one of a unique object serial number, a brand name, a model name, and an object photo; and said user device displaying the object details related to said object via a display screen of said user device; whereby, with the object details displayed on said user device, the associated user is able to visually compare and confirm whether the object details match said object being authenticated.

14. The method according to embodiments 1-13, wherein the step of the user application transmitting the data set and the device identifier to the authentication server, further comprises the step of, upon the authentication server determining that the user device does not have authorization to communicate with the authentication server, transmitting an error message to the user application.

15. The method according to embodiments 1-14, wherein each of the authentication devices is further configured for storing in memory as read-only an at least one object detail related to the corresponding object with which said authentication device is associated, each of the at least one object detail comprising: a detail code that is unique as compared to the detail code of any other object detail stored on said authentication device; and a detail content containing at least one of an object serial number, a brand name, a brand logo, a model name, an object photo, images, letters, numbers, icons, signatures, graphics, artwork, and audible sounds, the detail content being set by the authentication server upon said authentication device being initiated.

16. The method according to embodiments 1-15, further comprising the steps of: the authentication device associated with a one of the objects receiving a signal, said signal containing the detail code associated with at least one of the object details stored on said authentication device; and said authentication device producing the detail content associated with said at least one transmitted detail code via at least one of a display screen or a speaker provided by said authentication device.

17. The method according to embodiments 1-16, wherein the step of the authentication device receiving a signal further comprises the step of said authentication device receiving the detail code associated with at least one of the object details stored on said authentication device as manually input via a manual input peripheral provided by said authentication device.

18. The method according to embodiments 1-17, wherein the step of the authentication device receiving a signal further comprises the step of an authentication transceiver of the authentication device receiving the detail code associated with at least one of the object details stored on said authentication device as transmitted by one of the user application or the authentication server.

19. The method according to embodiments 1-18, wherein the detail code associated with at least one of the object details is dynamically generated and periodically regenerated by the associated authentication device, with said object detail further comprising: a detail count which increments each time said authentication device dynamically generates a new detail code for said object detail; and a sequence of detail codes corresponding to the incrementing detail count values and generated based on a detail sequence algorithm that is unique to said object detail, as compared to the detail sequence algorithm of any other object detail stored on said authentication device, said detail sequence algorithm being set by the authentication server upon said authentication device being initiated.

20. The method according to embodiments 1-19, further comprising the steps of, upon said authentication device receiving a triggering event for a new detail code for at least one object detail associated with said authentication device: the authentication device incrementing the detail count associated with said at least one object detail and advancing the detail code to the next value in the sequence of detail codes corresponding to the detail count and the detail sequence algorithm associated with said object detail; and the authentication device transmitting one or both of the new detail code for said at least one object detail and the detail count to the authentication server to be stored in the at least one authentication table.

21. The method according to embodiments 1-20, wherein the at least one authentication table further contains, for each of the authentication devices, owner details associated with a current owner of the object with which said authentication device is associated.

22. The method according to embodiments 1-21, wherein the step of the authentication server determining that the device sequence value is later in the sequence than the server sequence value further comprises the steps of: the authentication server transmitting select owner details related to said object, as stored in the at least one authentication table, to the user application; and said user device displaying said select owner details related to said object via a display screen of said user device.

23. The method according to embodiments 1-22, wherein the at least one authentication table further contains, for each of the authentication devices, an object status containing a status identifier related to the object with which said authentication device is associated.

24. The method according to embodiments 1-23, further comprising the steps of: upon the authentication server receiving notice of a one of the objects being lost, stolen or tampered with, the authentication server changing the object status for said object in the at least one authentication table to "lost," "stolen" or "tampered," respectively; and upon a subsequent attempt to authenticate said object via a one of the at least one user device: upon the authentication server determining that the device sequence value is later in the sequence than the server sequence value, the authentication server transmitting an appropriate "lost," "stolen" or "tampered" notification to the user application.

25. The method according to embodiments 1-24, wherein the step of the authentication server transmitting a "lost," "stolen" or "tampered" notification to the user application further comprises the steps of: the user application transmitting current GPS coordinates of said authentication device or said user device to the authentication server; and the authentication server transmitting the GPS coordinates of said authentication device or said user device to a current owner of the object with which said authentication device is associated.

26. The method according to embodiments 1-25, further comprising the step of, upon said authentication device receiving a valid detail code, the authentication server changing the object status for the object with which said authentication device is associated in the at least one authentication table to "good" or "found."

27. An object authentication system for authenticating objects, the system comprising: an authentication server configured for receiving and processing data related to the objects; a plurality of authentication devices, each of the authentication devices associated with a one of the objects, each of the authentication devices configured for storing at least one of a unique device identifier, a unique device key, a device count which increments each time said authentication device is utilized to authenticate the corresponding object with which said authentication device is associated, a sequence of device sequence values corresponding to the incrementing device count values and generated based on an authentication sequence algorithm unique to at least one of said authentication device, a select group of authentication devices, the corresponding object with which said authentication device is associated, or a select group of objects, as compared to other ones of the authentication devices or objects with which other ones of the authentication devices are associated, each of the unique device identifier, unique device key, and unique authentication sequence algorithm associated with each of the authentication devices being set by the authentication server upon each said authentication device being initiated; an at least one authentication table in communication with the authentication server, the at least one authentication table containing, for each of the authentication devices, the device identifier of said authentication device, the authentication sequence algorithm associated with said authentication device for generating a sequence of server sequence values identical to the sequence of device sequence values, and the device key currently associated with said authentication device; and an at least one user device under the control of an at least one user and in selective communication with each of the authentication server and the at least one authentication device, the at least one user device providing a user application residing in memory thereon; wherein, upon an attempt to authenticate a one of the objects via a one of the at least one user device, the system is configured for: receiving, via the authentication device associated with said object, an authentication request; incrementing, via said authentication device, the device count; advancing, via said authentication device, the device sequence value corresponding to the device count and the authentication sequence algorithm associated with said authentication device; generating, via said authentication device, a data set comprising the device sequence value; providing, via said authentication device, the data set and the device identifier to the user application corresponding to said one of the at least one user device; transmitting, via the user application, the data set and the device identifier to the authentication server; accessing, via the authentication server, the authentication table based on the transmitted device identifier; upon the authentication server determining that the transmitted device identifier does not match any of the device identifiers stored in the at least one authentication table, transmitting, via the authentication server, an error message to the user application; upon the authentication server locating the transmitted device identifier in the at least one authentication table: obtaining, via the authentication server, the server sequence value associated with the transmitted device identifier; upon the authentication server determining that the device sequence value is earlier in the sequence than the server sequence value, or in the same position in the sequence as the server sequence value, transmitting, via the authentication server, an error message to the user application; and upon the authentication server determining that the device sequence value is later in the sequence than the server sequence value: transmitting, via the authentication server, a success message to the user application; and setting, via the authentication server, the server sequence value to be equal to the device sequence value; whereby, during said attempt to authenticate said object via said user device, no data is transmitted or written to the authentication device associated with said object by either said user device or the authentication server.

28. The object authentication system according to embodiment 27, wherein while providing, via the authentication device, the data set and the device identifier to the user application, the system is further configured for: encrypting, via the authentication device, an at least one portion of the data set using the device key; obtaining, via the authentication server, the device key associated with the transmitted device identifier; attempting to process the data set, via the authentication server, using the device key; and upon the authentication server determining that processing the data set was unsuccessful, transmitting, via the authentication server, an error message to the user application.

29. The object authentication system according to embodiments 27-28, wherein while attempting to process the data set, via the authentication server, using the device key, the system is further configured for decrypting the encrypted portions of the data set, via the authentication server, using the device key.

30. The object authentication system according to embodiments 27-29, wherein the authentication device provides a switch configured for being selectively triggered to initiate the authentication request.

31. The object authentication system according to embodiments 27-30, wherein: the at least one user device provides a user transceiver; and the at least one authentication device provides an authentication transceiver; wherein, the user application of said user device is configured for transmitting a signal via the user transceiver when initiating an authentication request, said signal subsequently being received by the authentication transceiver.

32. The object authentication system according to embodiments 27-31, wherein the authentication device is configured for automatically powering on upon receiving the authorization request.

33. The object authentication system according to embodiments 27-32, wherein the authentication device is configured for automatically transitioning into one of a powered down state or low power state upon providing the data set and the device identifier to the user application.

34. The object authentication system according to embodiments 27-33, wherein while providing, via the authentication device, the data set and the device identifier to the user application, the system is further configured for: converting, via the authentication device, the data set and the device identifier into a visual code; displaying, via the authentication device, the visual code via a display screen provided by the authentication device; and obtaining, via the user application, the visual code via a camera provided by the user device.

35. The object authentication system according to embodiments 27-34, wherein while providing, via the authentication device, the data set and the device identifier to the user application, the system is further configured for: converting, via the authentication device, the data set and the device identifier into an acoustic signal; producing, via the authentication device, the acoustic signal using a speaker provided by the authentication device; and obtaining, via the user application, the acoustic signal via a microphone provided by the user device.

36. The object authentication system according to embodiments 27-35, wherein while providing, via the authentication device, the data set and the device identifier to the user application, the system is further configured for: converting, via the authentication device, the data set and the device identifier into a digital signal; transmitting, via the authentication device, the digital signal using an authentication transceiver provided by the authentication device; and obtaining, via the user application, the digital signal via a user transceiver provided by the user device.

37. The object authentication system according to embodiments 27-36, wherein while determining that the device sequence value is later in the sequence than the server sequence value, the system is further configured for transmitting, via the authentication server, an error message to the user application upon the authentication server determining that a difference between the relative positions of the device sequence value and the server sequence value within the sequence exceeds a pre-defined threshold value.

38. The object authentication system according to embodiments 27-37, wherein while determining, via the authentication server, that the device sequence value is later in the sequence than the server sequence value, the system is further configured for transmitting, via the authentication server, select details related to said object, as stored in the at least one authentication table, to the user application.

39. The object authentication system according to embodiments 27-38, wherein while determining that the device sequence value is later in the sequence than the server sequence value, the system is further configured for: transmitting, via the authentication server, select object details related to said object, as stored in the at least one authentication table, to the user application, said object details comprising at least one of a unique object serial number, a brand name, a model name, and an object photo; and displaying, via a display screen of said user device, the object details related to said object; whereby, with the object details displayed on said user device, the associated user is able to visually compare and confirm whether the object details match said object being authenticated.

40. The object authentication system according to embodiments 27-39, wherein while transmitting, via the user application, the data set and the device identifier to the authentication server, the system is further configured for transmitting, via the authentication server, an error message to the user application upon the authentication server determining that the user device does not have authorization to communicate with the authentication server.

41. The object authentication system according to embodiments 27-40, wherein each of the authentication devices is further configured for storing in memory as read-only an at least one object detail related to the corresponding object with which said authentication device is associated, each of the at least one object detail comprising: a detail code that is unique as compared to the detail code of any other object detail stored on said authentication device; and a detail content containing at least one of an object serial number, a brand name, a brand logo, a model name, an object photo, images, letters, numbers, icons, signatures, graphics, artwork, and audible sounds, the detail content being set by the authentication server upon said authentication device being initiated.

42. The object authentication system according to embodiments 27-41, wherein the system is further configured for: receiving, via the authentication device associated with a one of the objects, a signal, said signal containing the detail code associated with at least one of the object details stored on said authentication device; and producing, via said authentication device, the detail content associated with said at least one transmitted detail code via at least one of a display screen or a speaker provided by said authentication device.

43. The object authentication system according to embodiments 27-42, wherein the at least one authentication device provides a manual input peripheral configured for receiving the detail code associated with at least one of the object details stored on said authentication device.

44. The object authentication system according to embodiments 27-43, wherein the at least one authentication device provides an authentication transceiver configured for receiving the detail code associated with at least one of the object details stored on said authentication device as transmitted by one of the user application or the authentication server.

45. The object authentication system according to embodiments 27-44, wherein the at least one authentication device is configured for dynamically generating and periodically regenerating the detail code associated with at least one of the object details, said object detail further comprising: a detail count which increments each time said authentication device dynamically generates a new detail code for said object detail; and a sequence of detail codes corresponding to the incrementing detail count values and generated based on a detail sequence algorithm that is unique to said object detail, as compared to the detail sequence algorithm of any other object detail stored on said authentication device, said detail sequence algorithm being set by the authentication server upon said authentication device being initiated.

46. The object authentication system according to embodiments 27-45, wherein, upon the occurrence of a triggering event, the authentication device is configured for generating a new detail code for at least one object detail associated with said authentication device by: incrementing the detail count associated with said at least one object detail and advancing the detail code to the next value in the sequence of detail codes corresponding to the detail count and the detail sequence algorithm associated with said object detail; and transmitting one or both of the new detail code and the detail count for said at least one object detail to the authentication server to be stored in the at least one authentication table.

47. The object authentication system according to embodiments 27-46, wherein the at least one authentication table further contains, for each of the authentication devices, owner details associated with a current owner of the object with which said authentication device is associated.

48. The object authentication system according to embodiments 27-47, wherein while determining that the device sequence value is later in the sequence than the server sequence value the system is further configured for: transmitting, via the authentication server, select owner details related to said object, as stored in the at least one authentication table, to the user application; and displaying, via a display screen of said user device, said select owner details related to said object.

49. The object authentication system according to embodiments 27-48, wherein the at least one authentication table further contains, for each of the authentication devices, an object status containing a status identifier related to the object with which said authentication device is associated.

50. The object authentication system according to embodiments 27-49, upon the authentication server receiving notice of a one of the objects being lost, stolen or tampered with, the system is further configured for: changing, via the authentication server, the object status for said object in the at least one authentication table to "lost," "stolen" or "tampered," respectively; and upon a subsequent attempt to authenticate said object via a one of the at least one user device: upon the authentication server determining that the device sequence value is later in the sequence than the server sequence value, transmitting, via the authentication server, an appropriate "lost," "stolen" or "tampered" notification to the user application.

51. The object authentication system according to embodiments 27-50, wherein the system is further configured for: transmitting, via the user application, current GPS coordinates of said authentication device or said user device to the authentication server; and transmitting, via the authentication server, the GPS coordinates of said authentication device or said user device to a current owner of the object with which said authentication device is associated.

52. The object authentication system according to embodiments 27-51, wherein the system is further configured for changing the object status for the object with which said authentication device is associated in the at least one authentication table to "good" or "found" upon said authentication device receiving a valid detail code.

53. A method for authenticating physical or digital objects, the method comprising the steps of: implementing an authentication server configured for receiving and processing data related to the objects; initiating a plurality of authentication devices, each of the authentication devices associated with a one of the objects, each of the authentication devices configured for storing at least one of: a unique device identifier, a unique device key, a device count which increments each time said authentication device is utilized to authenticate the corresponding object with which said authentication device is associated, a sequence of device sequence values corresponding to the incrementing device count values and generated based on an authentication sequence algorithm unique to at least one of said authentication device, a select group of authentication devices, the corresponding object with which said authentication device is associated, or a select group of objects, as compared to other ones of the authentication devices or objects with which other ones of the authentication devices are associated, and an at least one object detail related to the corresponding object with which said authentication device is associated, each of the at least one object detail comprising: a detail code that is unique as compared to the detail code of any other object detail stored on said authentication device; and a detail content containing at least one of an object serial number, a brand name, a brand logo, a model name, an object photo, images, letters, numbers, icons, signatures, graphics, artwork, and audible sounds, the detail content being set by the authentication server upon said authentication device being initiated, each of the unique device identifier, unique device key, unique authentication sequence algorithm, and detail content of the at least one object detail associated with each of the authentication devices being set by the authentication server upon each said authentication device being initiated; maintaining an at least one authentication table in communication with the authentication server, the at least one authentication table containing, for each of the authentication devices, the device identifier of said authentication device, the authentication sequence algorithm associated with said authentication device for generating a sequence of server sequence values identical to the sequence of device sequence values, and the device key currently associated with said authentication device; implementing a user application residing in memory on an at least one user device under the control of an at least one user, the at least one user device in selective communication with each of the authentication server and the at least one authentication device; and upon an attempt to authenticate a one of the objects via a one of the at least one user device: initiating an authentication request with the associated authentication device; the authentication device incrementing the device count and advancing the device sequence value corresponding to the device count and the authentication sequence algorithm associated with the authentication device; the authentication device generating a data set comprising the device sequence value; the authentication device providing the data set and the device identifier to the user application corresponding to said one of the at least one user device; the user application transmitting the data set and the device identifier to the authentication server; the authentication server accessing the authentication table based on the transmitted device identifier; upon the authentication server determining that the transmitted device identifier does not match any of the device identifiers stored in the at least one authentication table, the authentication server transmitting an error message to the user application; upon the authentication server locating the transmitted device identifier in the at least one authentication table: the authentication server obtaining the server sequence value associated with the transmitted device identifier; upon the authentication server determining that the device sequence value is earlier in the sequence than the server sequence value, or in the same position in the sequence as the server sequence value, the authentication server transmitting an error message to the user application; and upon the authentication server determining that the device sequence value is later in the sequence than the server sequence value: the authentication server transmitting a success message to the user application; and the authentication server setting the server sequence value to be equal to the device sequence value; and upon the authentication device associated with a one of the objects receiving a signal containing the detail code associated with at least one of the object details stored on said authentication device, said authentication device producing the detail content associated with said at least one transmitted detail code via at least one of a display screen or a speaker provided by said authentication device; whereby, during said attempt to authenticate said object via said user device, or upon receiving a signal containing a detail code, no data is written to the authentication device associated with said object by either said user device or the authentication server.

In closing, regarding the exemplary embodiments of the present invention as shown and described herein, it will be appreciated an object authentication system and associated methods are disclosed and configured for authenticating an at least one physical or digital object via an authentication device attached to said object. Because the principles of the invention may be practiced in a number of configurations beyond those shown and described, it is to be understood that the invention is not in any way limited by the exemplary embodiments, but is generally directed to an object authentication system and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment. Additionally, the various illustrative logical blocks, modules, methods, and authentication sequence algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The phrase "non-transitory," in addition to having its ordinary meaning, as used in this document means "enduring or long-lived". The phrase "non-transitory computer readable medium," in addition to having its ordinary meaning, includes any and all computer readable mediums, with the sole exception of a transitory, propagating signal. This includes, by way of example and not limitation, non-transitory computer-readable mediums such as register memory, processor cache and random-access memory ("RAM").

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate object, such as a motherboard, or (b) an end object. The end object can be any object that includes integrated circuit chips, ranging from toys and other low-end applications to advanced computer objects having a display, a keyboard or other input device, and a central processor.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for authenticating physical or digital objects, the method comprising the steps of:
   implementing an authentication server configured for receiving and processing data related to the objects;
   initiating a plurality of authentication devices, each of the authentication devices associated with a one of the objects, such that each of the objects is associated with a one of the authentication devices, each of the authentication devices storing a unique device identifier, a unique device key, a device count which increments each time said authentication device is utilized to authenticate the corresponding object with which said authentication device is associated, an authentication sequence algorithm unique to at least one of said authentication device, a select group of authentication devices, the corresponding object with which said authentication device is associated, or a select group of objects, as compared to other ones of the authentication devices or objects with which other ones of the authentication devices are associated, and a device sequence value that updates each time said authentication device is utilized to authenticate the corresponding object with which said authentication device is associated, with the device sequence value being based on the authentication sequence algorithm as a function of the device count associated with said authentication device, each of the unique device identifier, unique device key, and unique authentication sequence algorithm associated with each of the authentication devices being set by the authentication server upon each said authentication device being initiated;
   maintaining an at least one authentication table in communication with the authentication server, the at least one authentication table containing, for each of the authentication devices, the device identifier of said authentication device, the authentication sequence algorithm associated with said authentication device, a sequence of device sequence values generated using the same authentication sequence algorithm used to update the device sequence value of said authentication device and based on the incrementing device count values associated with said authentication device, a server sequence value that updates each time the authentication server authenticates the object with which said authentication device is associated, the server sequence value generated using the same authentication sequence algorithm used to update the device sequence value of said authentication device, and the unique device key stored in said authentication device;
   implementing a user application residing in memory on an at least one user device under the control of an at least one user, the at least one user device in selective communication with each of the authentication server and the at least one authentication device;
   receiving an attempt to authenticate a one of the objects via a one of the at least one user device; and
   upon receiving an attempt to authenticate a one of the objects via a one of the at least one user device:
      initiating an authentication request with the associated authentication device;
      the authentication device incrementing the device count and updating the device sequence value based on the device count and the authentication sequence algorithm associated with the authentication device;
      the authentication device generating a data set comprising the device sequence value;
      the authentication device providing the data set and the device identifier to the user application corresponding to said one of the at least one user device;
      the user application transmitting the data set and the device identifier to the authentication server;
      the authentication server accessing the authentication table based on the transmitted device identifier;
      upon the authentication server determining that the transmitted device identifier does not match any of the device identifiers stored in the at least one authentication table, the authentication server transmitting an error message to the user application;
      upon the authentication server locating the transmitted device identifier in the at least one authentication table:
         the authentication server obtaining the server sequence value associated with the transmitted device identifier;
         upon the authentication server determining that the device sequence value is earlier in the sequence of device sequence values than the server sequence value, or in the same position in the sequence of device sequence values as the server sequence value, the authentication server transmitting an error message to the user application; and
         upon the authentication server determining that the device sequence value is later in the sequence of device sequence values than the server sequence value:
            the authentication server transmitting a success message to the user application; and
            the authentication server setting the server sequence value to be equal to the device sequence value;
      whereby, during said attempt to authenticate said object via said user device, no data is transmitted or written to the authentication device associated with said object by either said user device or the authentication server.

2. The method of claim 1, wherein the step of determining that the device sequence value is later in the sequence of device sequence values than the server sequence value further comprises a step of, upon the authentication server determining that a difference between a relative position of the device sequence value within the sequence of device sequence values and a relative position of the server sequence value within the sequence of device sequence values exceeds a pre-defined threshold value, the authentication server transmitting an error message to the user application.

3. The method of claim 1, wherein the authentication server determining that the device sequence value is later in the sequence of device sequence values than the server sequence value further comprises steps of:
   the authentication server transmitting select object details related to said object, as stored in the at least one authentication table, to the user application, said object details comprising at least one of a unique object serial number, a brand name, a model name, and an object photo; and
   said user device displaying the object details related to said object via a display screen of said user device.

4. The method of claim 1, wherein each of the authentication devices is further stores in memory as read-only an at least one object detail related to the corresponding object with which said authentication device is associated, each of the at least one object detail comprising:
- a detail code that is unique as compared to the detail code of any other object detail stored on said authentication device; and
- a detail content containing at least one of an object serial number, a brand name, a brand logo, a model name, an object photo, images, letters, numbers, icons, signatures, graphics, artwork, and audible sounds, the detail content being set by the authentication server upon said authentication device being initiated.

5. The method of claim 4, further comprising steps of:
the authentication device associated with said object receiving a signal, said signal containing the detail code; and
said authentication device producing the detail content associated with said detail code via at least one of a display screen or a speaker provided by said authentification device.

6. The method of claim 4, wherein the detail code associated with at least one of the object details is dynamically generated and periodically regenerated by the associated authentication device, with said object detail further comprising:
- a detail count which increments each time said authentication device dynamically generates a new detail code for said object detail; and
- a sequence of detail codes corresponding to the incrementing detail count values and generated based on a detail sequence algorithm that is unique to said object detail, as compared to the detail sequence algorithm of any other object detail stored on said authentication device, said detail sequence algorithm being set by the authentication server upon said authentication device being initiated.

7. The method of claim 6, further comprising the steps of, upon said authentication device receiving a triggering event for a new detail code for at least one object detail associated with said authentication device:
the authentication device incrementing the detail count associated with said at least one object detail and advancing the detail code to the next value in the sequence of detail codes corresponding to the detail count and the detail sequence algorithm associated with said object detail; and
the authentication device transmitting one or both of the new detail code and the detail count for said at least one object detail to the authentication server to be stored in the at least one authentication table.

8. The method of claim 1, wherein the at least one authentication table further contains, for each of the authentication devices, an object status containing a status identifier related to the object with which said authentication device is associated.

9. The method of claim 8, further comprising the steps of:
upon the authentication server receiving notice of a one of the objects being lost, stolen or tampered with, the authentication server changing the object status for said object in the at least one authentication table to "lost," "stolen" or "tampered," respectively; and
upon a subsequent attempt to authenticate said object via a one of the at least one user device:
upon the authentication server determining that the device sequence value is later in the sequence than the server sequence value, the authentication server transmitting an appropriate "lost," "stolen" or "tampered" notification to the user application.

10. The method of claim 9, wherein the step of the authentication server determining that the device sequence value is later in the sequence of device sequence values than the server sequence value further comprises the steps of:
the user application transmitting current global positioning system ("GPS") coordinates of said authentication device or said user device to the authentication server; and
the authentication server transmitting the GPS coordinates of said authentication device or said user device to a current owner of the object with which said authentication device is associated.

11. An object authentication system for authenticating objects, the system comprising:
an authentication server configured for receiving and processing data related to the objects;
a plurality of authentication devices, each of the authentication devices associated with a one of the objects, such that each of the objects is associated with a one of the authentication devices, each of the authentication devices storing a unique device identifier, a unique device key, a device count which increments each time said authentication device is utilized to authenticate the corresponding object with which said authentication device is associated, an authentication sequence algorithm unique to at least one of said authentication device, a select group of authentication devices, the corresponding object with which said authentication device is associated, or a select group of objects, as compared to other ones of the authentication devices or objects with which other ones of the authentication devices are associated, and a device sequence value that updates each time said authentication device is utilized to authenticate the corresponding object with which said authentication device is associated, with the device sequence value being based on the authentication sequence algorithm as a function of the device count associated with said authentication device, each of the unique device identifier, unique device key, and unique authentication sequence algorithm associated with each of the authentication devices being set by the authentication server upon each said authentication device being initiated;
an at least one authentication table in communication with the authentication server, the at least one authentication table containing, for each of the authentication devices, the device identifier of said authentication device, the authentication sequence algorithm associated with said authentication device, a sequence of device sequence values generated using the same authentication sequence algorithm used to update the device sequence value of said authentication device and based on the incrementing device count values associated with said authentication device, a server sequence value that updates each time the authentication server authenticates the object with which said authentication device is associated, the server sequence value generated using the same authentication sequence algorithm used to update the device sequence value of said authentication device, and the unique device key stored in said authentication device; and
an at least one user device under the control of an at least one user and in selective communication with each of the authentication server and the at least one authentication device, the at least one user device providing a user application residing in memory thereon;

wherein, the system authenticates a one of the objects via a one of the at least one user device by:

receiving, via the authentication device associated with said object, an authentication request;

incrementing, via said authentication device, the device count;

updating, via said authentication device, the device sequence value based on the device count and the authentication sequence algorithm associated with said authentication device;

generating, via said authentication device, a data set comprising the device sequence value;

providing, via said authentication device, the data set and the device identifier to the user application corresponding to said one of the at least one user device;

transmitting, via the user application, the data set and the device identifier to the authentication server;

accessing, via the authentication server, the authentication table based on the transmitted device identifier;

upon the authentication server determining that the transmitted device identifier does not match any of the device identifiers stored in the at least one authentication table, transmitting, via the authentication server, an error message to the user application;

upon the authentication server locating the transmitted device identifier in the at least one authentication table:

obtaining, via the authentication server, the server sequence value associated with the transmitted device identifier;

upon the authentication server determining that the device sequence value is earlier in the sequence of device sequence values than the server sequence value, or in the same position in the sequence of device sequence values as the server sequence value, transmitting, via the authentication server, an error message to the user application; and upon the authentication server determining that the device sequence value is later in the sequence of device sequence values than the server sequence value:

transmitting, via the authentication server, a success message to the user application; and setting, via the authentication server, the server sequence value to be equal to the device sequence value;

whereby, during said attempt to authenticate said object via said user device, no data is transmitted or written to the authentication device associated with said object by either said user device or the authentication server.

12. The object authentication system of claim 11, wherein while determining that the device sequence value is later in the sequence of device sequence values than the server sequence value, the system transmits, via the authentication server, an error message to the user application upon the authentication server determining that a difference between a relative position of the device sequence value within the sequence of device sequence values and a relative position of the server sequence value within the sequence of device sequence values exceeds a pre-defined threshold value.

13. The object authentication system of claim 12, wherein each of the authentication devices further stores in memory as read-only an at least one object detail related to the corresponding object with which said authentication device is associated, each of the at least one object detail comprising:

a detail code that is unique as compared to the detail code of any other object detail stored on said authentication device; and a detail content containing at least one of an object serial number, a brand name, a brand logo, a model name, an object photo, images, letters, numbers, icons, signatures, graphics, artwork, and audible sounds, the detail content being set by the authentication server upon said authentication device being initiated.

14. The object authentication system of claim 13, wherein the system further:

receives, via the authentication device associated with said object, a signal, said signal containing the detail code; and produces, via said authentication device, the detail content associated with said detail code via at least one of a display screen or a speaker provided by said authentication device.

15. The object authentication system of claim 13, wherein the at least one authentication device dynamically generates and periodically regenerates the detail code associated with at least one of the object details, said object detail further comprising:

a detail count which increments each time said authentication device dynamically generates a new detail code for said object detail; and a sequence of detail codes corresponding to the incrementing detail count values and generated based on a detail sequence algorithm that is unique to said object detail, as compared to the detail sequence algorithm of any other object detail stored on said authentication device, said detail sequence algorithm being set by the authentication server upon said authentication device being initiated.

16. The object authentication system of claim 15, wherein, upon the occurrence of a triggering event, the authentication device generates a new detail code for at least one object detail associated with said authentication device by:

incrementing the detail count associated with said at least one object detail and advancing the detail code to the next value in the sequence of detail codes corresponding to the detail count and the detail sequence algorithm associated with said object detail; and transmitting one or both of the new detail code and the detail count for said at least one object detail to the authentication server to be stored in the at least one authentication table.

17. The object authentication system of claim 11, wherein the at least one authentication table further contains, for each of the authentication devices, an object status containing a status identifier related to the object with which said authentication device is associated.

18. The object authentication system of claim 17, upon the authentication server receiving notice of a one of the objects being lost, stolen or tampered with, the system further:

changes, via the authentication server, the object status for said object in the at least one authentication table to "lost," "stolen" or "tampered," respectively; and upon a subsequent attempt to authenticate said object via a one of the at least one user device:

upon the authentication server determining that the device sequence value is later in the sequence than the server sequence value, transmits, via the authentication server, a "lost," "stolen" or "tampered" notification to the user application.

19. The object authentication system of claim 18, wherein the system further:
   transmits, via the user application, current global positioning system ("GPS") coordinates of said authentication device or said user device to the authentication server; and
   transmits, via the authentication server, the GPS coordinates of said authentication device or said user device to a current owner of the object with which said authentication device is associated.

20. A method for authenticating physical or digital objects, the method comprising the steps of:
   implementing an authentication server configured for receiving and processing data related to the objects;
   initiating a plurality of authentication devices, each of the authentication devices associated with a one of the objects, such that each of the objects is associated with a one of the authentication devices, each of the authentication devices storing:
      a unique device identifier,
      a unique device key,
      a device count which increments each time said authentication device is utilized to authenticate the corresponding object with which said authentication device is associated,
      an authentication sequence algorithm unique to at least one of said authentication device, a select group of authentication devices, the corresponding object with which said authentication device is associated, or a select group of objects, as compared to other ones of the authentication devices or objects with which other ones of the authentication devices are associated,
      a device sequence value that updates each time said authentication device is utilized to authenticate the corresponding object with which said authentication device is associated, with the device sequence value being based on the authentication sequence algorithm as a function of the device count associated with said authentication device, and
      an at least one object detail related to the corresponding object with which said authentication device is associated, each of the at least one object detail comprising:
         a detail code that is unique as compared to the detail code of any other object detail stored on said authentication device; and
         a detail content containing at least one of an object serial number, a brand name, a brand logo, a model name, an object photo, images, letters, numbers, icons, signatures, graphics, artwork, and audible sounds, the detail content being set by the authentication server upon said authentication device being initiated,
      each of the unique device identifier, unique device key, unique authentication sequence algorithm, and detail content of the at least one object detail associated with each of the authentication devices being set by the authentication server upon each said authentication device being initiated;
   maintaining an at least one authentication table in communication with the authentication server, the at least one authentication table containing, for each of the authentication devices, the device identifier of said authentication device, the authentication sequence algorithm associated with said authentication device, a sequence of device sequence values generated using the same authentication sequence algorithm used to update the device sequence value of said authentication device and based on the incrementing device count values associated with said authentication device, a server sequence value that updates each time the authentication server authenticates the object with which said authentication device is associated, the server sequence value generated using the same authentication sequence algorithm used to update the device sequence value of said authentication device, and the unique device key stored in said authentication device;
   implementing a user application residing in memory on an at least one user device under the control of an at least one user, the at least one user device in selective communication with each of the authentication server and the at least one authentication device;
   receiving an attempt to authenticate a one of the objects via a one of the at least one user device; and
   upon receiving an attempt to authenticate a one of the objects via a one of the at least one user device:
      initiating an authentication request with the associated authentication device;
      the authentication device incrementing the device count and updating the device sequence value based on the device count and the authentication sequence algorithm associated with the authentication device;
      the authentication device generating a data set comprising the device sequence value;
      the authentication device providing the data set and the device identifier to the user application corresponding to said one of the at least one user device;
      the user application transmitting the data set and the device identifier to the authentication server;
      the authentication server accessing the authentication table based on the transmitted device identifier;
      upon the authentication server determining that the transmitted device identifier does not match any of the device identifiers stored in the at least one authentication table, the authentication server transmitting an error message to the user application;
      upon the authentication server locating the transmitted device identifier in the at least one authentication table:
         the authentication server obtaining the server sequence value associated with the transmitted device identifier;
         upon the authentication server determining that the device sequence value is earlier in the sequence of device sequence values than the server sequence value, or in the same position in the sequence of device sequence values as the server sequence value, the authentication server transmitting an error message to the user application; and
         upon the authentication server determining that the device sequence value is later in the sequence of device sequence values than the server sequence value:
            the authentication server transmitting a success message to the user application; and
            the authentication server setting the server sequence value to be equal to the device sequence value;

whereby, during said attempt to authenticate said object via said user device, no data is transmitted or written to the authentication device associated with said object by either said user device or the authentication server.

* * * * *